United States Patent
Swartz et al.

[11] Patent Number: 5,449,652
[45] Date of Patent: Sep. 12, 1995

[54] CERAMIC COMPOSITIONS FOR BZN DIELECTRIC RESONATORS

[75] Inventors: Scott L. Swartz, Columbus, Ohio; Thomas R. Shrout, Port Matilda, Pa.

[73] Assignee: Battelle Memorial Institute, Columbus, Ohio

[21] Appl. No.: 309,541

[22] Filed: Sep. 20, 1994

Related U.S. Application Data

[63] Continuation of Ser. No. 71,725, Jun. 4, 1993, abandoned.

[51] Int. Cl.$^6$ .......................... C04B 35/2; C04B 35/46
[52] U.S. Cl. ..................... 501/134; 501/135; 501/136; 501/138
[58] Field of Search .............. 501/134, 135, 136, 138

[56] References Cited

U.S. PATENT DOCUMENTS

| | | | |
|---|---|---|---|
| 4,638,401 | 1/1987 | Ling et al. | 361/321 |
| 4,668,500 | 5/1987 | Yamanoi et al. | 501/134 |
| 4,978,646 | 12/1990 | Bardhan et al. | 501/138 |

FOREIGN PATENT DOCUMENTS

| | | | |
|---|---|---|---|
| 0029151 | 9/1970 | Japan | 501/134 |
| 0035900 | 3/1977 | Japan | 501/134 |
| 4285046 | 10/1992 | Japan | . |
| 0975672 | 11/1982 | U.S.S.R. | 501/134 |

OTHER PUBLICATIONS

A Dielectric Resonator Method of Measuring Inductive Capacities in the Millimeter Range; B. W. Hakki and P. D. Coleman; IRE Transactions on Microwave Theory and Techniques; MTT-8; Jul. 1960; pp. 402–410.

Measurement of Small Dielectric Losses in Material with a Large Dielectric Constant at Microwave Frequencies; R. O. Bell and G. Rupprecht; IRE Transactions on Microwave Theory and Techniques; MTT-9; May 1961; pp. 239–242.

Microwave Bandpass Filters Containing High-Q Dielectric Resonators; Seymour B. Cohn; IEEE Transactions on Microwave Theory and Techniques; MTT-16 (4); Apr. 1968; pp. 218–227.

Analysis and Evaluation of a Method of Measuring the (List continued on next page.)

*Primary Examiner*—Deborah Jones
*Attorney, Agent, or Firm*—Klaus H. Wiesmann

[57] ABSTRACT

A dielectric ceramic composition comprising a sintered mixture represented by the formula:

$$Bi_{2-x}(Zn_{(2+y)/3}Nb_{4/3})O_{7-3x/2+y/3}$$

where: $0.240 \leq x \leq 0.333$, and $0.120 \leq y \leq 0.300$; and a dielectric composition given by the formula:

$$(Bi_{1-z}Ca_z)_{2-x}(Zn_{(2+y)/3}Nb_{4/3})O_{7-3x/2+y/3+xz/2-z}$$

where: $0 \leq x \leq 0.667$, $0 \leq y \leq 0.300$, and $0 < z \leq 0.200$; substitutions for Bi can be selected from the group consisting of Ca, Sr, Ba, Y, Pb, Cd, La and other rare earth oxides having atomic numbers 58–71 of the periodic table; substitutions for Zn can be selected from the group consisting of Mg, Ca, Co, Mn, Ni, and Cu; and substitutions for Nb can be selected from the group consisting of Ti, Zr, Hf, and Ta; wherein the substitutions comprise less than 20 mol % based on the Bi, Zn, and Nb content respectively.

Typically, BZN and calcium-modified BZN ceramics are prepared by the initial preparation of a $ZnNb_2O_6$ precursor; mixing of $ZnNb_2O_6$ with $Bi_2O_3$, $CaCO_3$, and/or ZnO; calcination to form a ceramic powder having two distinct crystalline phases with nominal stoichiometries of $Bi_2(Zn_{2/3}Nb_{4/3})O_7$ (T-BZN) and $Bi_{4/3}(Zn_{2/3}Nb_{4/3})O_6$ (C-BZN); and then sintering at temperatures less than 1100° C. to form a two-phase ceramic with T-BZN and C-BZN phases.

The BZN and calcium-modified BZN ceramics exhibit the following dielectric properties: large dielectric constant of $\epsilon_r > 100$, controlled temperature dependence of $|T_f| < 10$ ppm/°C., and low microwave loss of $Q \cdot f > 5000$ GHz.

15 Claims, 13 Drawing Sheets

OTHER PUBLICATIONS

Complex Permittivity and Permeability of Microwave Insulators; William E. Courtney; IEEE Transactions on Microwave Theory and Techniques; MTT-18; Aug. 1970; pp. 476–485.

$Ba_2Ti_9O_{20}$ as a Microwave Dielectric Resonator; J. K. Plourde, D. F. Linn, H. M. O'Bryan, Jr., and John Thomson, Jr.; Journal of The American Ceramic Society; 58 (9–10); Sep.–Oct. 1975; pp. 418–420.

Application of Dielectric Resonators in Microwave Components; James K. Plourde and Chung-Li Ren; IEEE Transactions on Microwave Theory and Techniques; MTT-29 (8); Aug. 1981; pp. 754–770.

Low-Fire Bismuth-Based Dielectric Ceramics for Microwave Use; Hiroshi Kagata, Tatsuya Inoue, Junichi Kato, and Ichirou Kameyama; Jpn. J. Appl. Phy.; 31 (Part 1, No. 9B); Sep. 1992; pp. 3152–3155.

Fabrication of Perovskite Lead Magnesium Niobate; S. L. Swartz and T. R. Shrout; Mat. Res. Bull.; 17; Jul. 1982; pp. 1245–1250.

Ceramics for Microwave Dielectric Resonator; Shoichiro Nomura; Ferroelectrics; 49; 1983; pp. 61–70 (no month).

Microwave Characteristics of $(Zr,Sn)TiO_4$ and $BaO-PbO-Nd_2O_3-TiO_2$ Dielectric Resonators; K. Wakino, K. Minai, and H. Tamura; Journal of the American Ceramic Society; 67 (4); Apr. 1984; pp. 278–281.

Dielectric Characteristics of $PbO-BaO-La_2O_3-TiO_2$ at Microwave Frequencies; Keisuke Kageyama and Mitsuhiro Takata; Japanese Journal of Applied Physics; 24 (Supplement 24-2); 1985; pp. 1045–1047 No Month.

Dielectric Ceramics for Microwave Applications; Hiromu Ouchi and Syunichiro Kawashima; Japanese Journal of Applied Physics; 24 (Supplement 24-2); 1985; pp. 60–64 No Month.

High Frequency Dielectrics and Their Applications; K. Wakino; Proceedings of the Sixth IEEE International Symposium on Application of Ferroelectrics; 1986; pp. 97–106 No Month.

Microwave Characteristics of $BaO-Bi_2O_3-TiO_2-Nd_2O_3$ Dielectric Resonators; J. M. Durand and J. P. Boilot; Journal of Materials Science Letters; 6; 1987; 134–136 No Month.

Microwave Dielectric Properties of $(Ba,Sr)O-Sm_2O_3-TiO_2$ Ceramics; Susumu Nishigaki, Hiroshi Kato, Shinsuke Yano, and Rikiya Kamimura; Am. Ceram. Soc. Bull.; 66 (9); 1987; pp. 1405–1410.

No Lead Low-Fired Multilayer Ceramic Capacitor (MLC) Dielectric Material; Wang Zhenping and Zhang Shiying; Proceedings of the 37th Electronic Components Conference; Catalog No. 87CH2448-9; 1987; pp. 413–419 No Month.

Recent Development of Dielectric Resonator Materials and Filters in Japan; K. Wakino; Ferroelectrics; 91; 1989; pp. 69–86.

High Dielectric Constant and Small Temperature Coefficient Bismuth-Based Dielectric Compositions; H. C. Ling, M. F. Yan, and W. W. Rhodes; J. Mater. Res.; 5 (8); Aug. 1990, pp. 1752–1762.

Low-Firing, Temperature-Stable Dielectric Compositions Based on Bismuth Nickel Zinc Niobates; Man F. Yan, Hung C. Ling, and Warren W. Rhodes; Journal of The American Ceramic Society; 73 (4); 1990; pp. 1106–1107 No Month.

Phase Structure and Dielectric Properties of $Bi_2O_3-ZnO-Nb_2O_5$-Based Dielectric Ceramics; Donhang Liu, Yi Liu, Shui-Q. Huang; and Xi Yao; Journal of The American Ceramic Society; 87 (8); 1993; pp. 2129–2132 No Month.

CERAMIC COMPOSITIONS FOR BZN DIELECTRIC RESONATORS

This is a continuation of application Ser. No. 08/071,725, filed on Jun. 4, 1993, now abandoned.

FIELD OF THE INVENTION

This invention, discloses low-loss and temperature-stabilized dielectric ceramics in the $Bi_2O_3$—$ZnO$—$Nb_2O_5$ (BZN) system. Also disclosed is modification of the BZN composition by excess ZnO additions and by CaO substitution for $Bi_2O_3$. A further disclosure involves the preparation of the BZN ceramics by a two-step process involving pre-reaction of ZnO and $Nb_2O_5$ to form an intermediate columbite-structured $ZnNb_2O_6$ powder, and then mixing $Bi_2O_3$ with $ZnNb_2O_6$ (and ZnO and/or $CaCO_3$) to form desired compositions. A final disclosure involves the preparation of BZN dielectric ceramics from mixtures of single-phase T-BZN and C-BZN powders.

The compositions are useful in microwave applications in the 1 to 12 GHz range as dielectric resonators in bandpass or bandstop filters and oscillator stabilizer devices. These materials are also useful as dielectric materials for multilayer capacitors.

BACKGROUND OF THE INVENTION

Ceramic dielectric resonators are used as bandpass or bandstop filters and oscillator stabilizer devices in the microwave frequency range of 1 to 12 GHz. These devices are becoming increasingly important with the continued development of microwave integrated circuitry, microwave telecommunications, and satellite broadcasting systems. See for example: (1) S. B. Cohn, IEEE Transactions on Microwave Theory and Technology MTT-16 (4), 218–227 (1968); (2) J. K. Plourde and C. L. Ren, IEEE Transactions on Microwave Theory and Technology MTT-29 (8), 754–770 (1981); (3) S. Nomura, Ferroelectrics 49 (1/2/3/4), 61–70 (1983); (4) H. Ouchi and S. Kawashima, Japanese Journal of Applied Physics 24 (Supplement 24-2), 60–64 (1985); and (5) K. Wakino, Proceedings of the Sixth IEEE International Symposium on Applications of Ferroelectrics, 97–106 (1986).

Although each application has specific requirements, important properties of microwave dielectric properties for resonator applications are the following:

The operating frequency, f, of a dielectric resonator is in the microwave frequency range of 1 to 12 GHz.

The relative dielectric permittivity or dielectric constant, should be greater than 30, and preferably larger than 80, depending on the specific application.

The dielectric loss or dissipation factor, tan δ, should be less than 0.001, and preferably less than 0.0002 at the operating frequency.

The dielectric loss quality, Q, which is approximately equal to 1/tan δ, should be greater than 1000, and preferably greater than 5000 at the operating frequency.

The temperature coefficient of resonant frequency, $T_f$, which is derived from the combined effects of thermal expansion and the temperature dependence of the dielectric permittivity, $T_\epsilon$, should be less than 10 ppm/°C., and preferably zero.

The scope of the present invention involves the use of dielectric resonant filters in microwave applications such as mobile telephones. These applications require ceramic materials with $\epsilon_r > 80$, $Q > 1000$, and $|T_f| < 10$ ppm/°C., within the desired frequency range of 1–2 GHz. It is difficult to achieve this combination of properties in present ceramic materials.

For the purposes of comparison of different microwave dielectric ceramics, where measurements are often made at different frequencies, it is useful to consider the theoretically predicted and experimentally confirmed relationship that the Q·f product is constant over the microwave frequency region of 1 to 12 GHz. See for example: (6) K. Wakino, Ferroelectrics 91, 69–86 (1989).

Microwave Dielectric Ceramic Compositions

A family of dielectric ceramics have been developed with compositions in the $BaO$—$RE_2O_3$—$TiO_2$ system, where $RE_2O_3$ is a rare earth oxide such as $Nd_2O_3$, $Sm_2O_3$, or $La_2O_3$, with additions of PbO, SrO, or $Bi_2O_3$. See for example: reference (4) cited above; (7) K. Wakino, et al., Journal of the American Ceramic Society 67 (4), 278–281 (1984); (8) S. Nishigaki, et al., American Ceramic Society Bulletin 66 (9), 1405–1410 (1987); (9) K. Kageyama and M. Takata, Japanese Journal of Applied Physics 24 (Supplement 24-2), 1045–1047 (1985); and (10) J. M. Durand and J. P. Boilot, Journal of Materials Science Letters 6, 134–136 (1987). Dielectric ceramics of this family have relatively high permittivity ($\epsilon_r = 70$–80), very low temperature dependence ($|T_f| < 5$ ppm/°C.), and extremely low microwave loss (Q·f = 5000 to 10,000 GHz).

$Bi_2O_3$—$ZnO$—$Nb_2O_5$ Ceramics

Promising results have been obtained for dielectric ceramics in the $Bi_2O_3$—$ZnO$—$Nb_2O_5$ (BZN) ceramic system, with various compositional modifications (e.g., NiO, CaO). These ceramics also have the advantage of relatively low sintering temperatures (less than 1000° C.). BZN ceramics have been developed as dielectric materials for multilayer capacitors, which operate at low frequencies (1 kHz to 1 MHz). See for example: (11) Wang Zhenping and Zhang Shiying, Proceedings of the 37th Electronic Components Conference (Catalog No. 87CH2448-9), 413–419 (1987). These workers identified dielectric ceramics with molar compositions of $Bi_2(Zn_xNb_{1.50})O_{6.75+x}$ (where $x = 0.8$ to 1.0) and $Bi_2Zn_{0.8}Nb_xO_{3.8+2.5x}$ (where $x = 0.70$ to 0.82). These BZN ceramics exhibited the following dielectric properties: $\epsilon_r = 75$ to 140, tan δ < 0.0005, and $T_\epsilon = -75$ to $+60$ ppm/°C. Further improvement in dielectric properties were achieved in BZN ceramics by additions of $Bi_2(Ni_{1.33}Nb_{0.67})O_{6.67}$. Results of dielectric measurements at microwave frequencies were not provided.

Low-frequency dielectric properties of BZN ceramics with compositions represented by the formula, $Bi_2(ZnNb_{2(1+d)})O_{3+6y+5dy}$ (where $0.6 < y < 1.0$ and $-0.05 < d < 0.05$) also have been reported. See for example: (12) M. F. Yan, et al., Journal of the American Ceramic Society 73 (4), 1106–1107 (1990); (13) H. C. Ling et al., Journal of Materials Research, 5 (8), 1752–1762 (1990); and (14) H. C. Ling and M. F. Yan, U.S. Pat. No. 4,638,401 (1987). Temperature-stable dielectric ceramics with $\epsilon_r$ values between 80 and 90, and tan δ values between 0.0003 and 0.0005 at 1 MHz, were obtained in this system. Properties of these BZN ceramics were further improved by additions of $Bi_3Ni_2NbO_9$. Results of dielectric measurements at microwave frequencies were not provided.

The microwave dielectric properties of a range of compositions in the BZN system recently have been reported. See for example: (15) H. Kagata, et al., Japanese Journal of Applied Physics 31, 3152–3155 (1992); and (16) H. Kagata and J. Kato, Japanese Patent Application No. 4-285046 (1992). Molar compositions evaluated were represented by the formula, $xBiO_{1.5} \cdot yZnO \cdot zNbO_{2.05}$ (where $0.41<x<0.51$, $0.19<y<0.30$, and $0.25<z<0.345$). BZN ceramics within this range exhibited the following microwave dielectric properties: $\epsilon_r=89$ to 133, $Q=40$ to 310 at 2–4 GHz, and $T_f=-110$ to $+120$ ppm/°C. It was also shown that a BZN ceramic with the composition $Bi_{18}Zn_8Nb_{12}O_{65}$ had microwave dielectric properties of: $\epsilon_r=82$, $Q=300$ at 3.2 GHz, and $T_f=-100$ ppm/°C. Refinement of the BZN composition with CaO substitution for ZnO resulted to a composition consisting of $45.75BiO_{1.5} \cdot 21.75(Ca_{0.725}Zn_{0.275})O \cdot 32.5NbO_{2.5}$, with $\epsilon_r=79$, $Q=360$ at 3.2 GHz, and $T_f=+1$ ppm/°C.

SUMMARY OF THE INVENTION

The invention typically comprises a dielectric ceramic composition of a sintered mixture represented by the formula, $$Bi_{2-x}(Zn_{(2+y)/3}Nb_{4/3})O_{7-3x/2+y/3}$$

wherein $0.240 \leq x \leq 0.333$, and $0.120 \leq y \leq 0.300$. More preferred are typical compositions where $0.25 \leq x \leq 0.30$, and $0.15 \leq y \leq 0.25$. In some embodiments the above compositions typically include:
(a) substitutions for Bi selected from the group consisting of Ca, Sr, Ba, Y, Pb, Cd, La and other rare earth elements having atomic numbers 58–71 of the periodic table, wherein said substitutions comprise less than 20 mol % based on Bi content; (b) substitutions for Zn selected from the group consisting of Mg, Ca, Co, Mn, Ni, and Cu, wherein said substitutions comprise less than 20 mol % based on Zn content; and (c) substitutions for Nb selected from the group consisting of Sn, Ti, Zr, Hf, and Ta, wherein said substitutions comprise less than 20 mol % based on Nb content; however, more preferred are substitutions for Bi, Zn, or Nb that are each less than 10 mol % based on Bi, Zn, or Nb content respectively. The above compositions typically have properties where:
Dielectric constant: $\epsilon_r=90$ to 120
Temperature dependence of $\epsilon$: $T_\epsilon = -100$ to 100 ppm/°C.
Temperature dependence of resonant frequency: $|T_f| \leq 100$ ppm/°C.
Tan $\delta$ at 100 kHz: tan $\delta < 0.0002$
Product of Microwave Q·f, (1–5 GHz): Q·f > 1000 GHz;
more preferably the characteristics comprise:
Dielectric constant: $\epsilon_r=90$ to 110
Temperature dependence of resonant frequency: $|T_f| \leq 20$ ppm/°C.
Product of Microwave Q·f, (1–5 GHz): Q·f $\geq$ 5000 GHz.
In yet another typical embodiment the dielectric constant, $\epsilon_r$, is $\geq 100$, and product of Microwave Q·f (at 1–5 GHz) $\geq 5000$ GHz.

In another embodiment, the invention typically comprises a dielectric ceramic composition of a sintered mixture represented by the formula, $$(Bi_{1-z}Ca_z)_{2-x}(Zn_{(2+y)/3}Nb_{4/3})O_{7-3x/2+y/3+xz/2-z}$$

wherein $0 \leq x \leq 0.667$, $0 \leq y \leq 0.300$, and $0 < z \leq 0.200$; however, more preferably $0.240 \leq x \leq 0.333$, $0.120 \leq y \leq 0.300$, and $0 \leq z \leq 0.200$; and most preferably $0.25 \leq x \leq 0.30$, $0.15 \leq y \leq 0.25$, and $0 \leq z \leq 0.10$. In some embodiments the above compositions typically include:
(a) substitutions for Bi selected from the group consisting of Ca, Sr, Ba, Y, Pb, Cd, La and other rare earth elements having atomic numbers 58–71 of the periodic table, wherein said substitutions comprise less than 20 mol % based on Bi content;
(b) substitutions for Zn selected from the group consisting of Mg, Ca, Co, Mn, Ni, and Cu, wherein said substitutions comprise less than 20 mol % based on Zn content; and (c) substitutions for Nb selected from the group consisting of Sn, Ti, Zr, Hf, and Ta, wherein said substitutions comprise less than 20 mol % based on Nb content; however, more preferred are substitutions for Bi, Zn, or Nb that are each less than 10 mol % based on Bi, Zn, or Nb content respectively. The compositions typically have properties where:
Dielectric constant: $\epsilon_r=80$ to 145
Temperature dependence of $\epsilon$: $T_\epsilon = -360$ to 200 ppm/°C.
Temperature dependence of resonant frequency: $|T_f| \leq 200$ ppm/°C.
Tan $\delta$ at 100 kHz: tan $\delta < 0.0002$
Product of Microwave Q·f, (1–5 GHz): Q·f > 1000 GHz;
more preferably the characteristics comprise:
Dielectric constant: $\epsilon_r=90$ to 110
Temperature dependence of resonant frequency: $|T_f| \leq 20$ ppm/°C.
Product of Microwave Q·f, (1–5 GHz): Q·f $\geq$ 5000 GHz.
In yet another typical embodiment the dielectric constant, $\epsilon_r \geq 100$, and product of Microwave Q·f (at 1–5 GHz) $\geq 5000$ GHz.

Another embodiment of the invention typically comprises a process for making a dielectric ceramic material including: a. providing a $ZnNb_2O_6$ precursor powder with columbite structure; b. mixing said $ZnNb_2O_6$ precursor powder with a $Bi_2O_3$ powder; c. calcining said mixture in the presence of an oxygen-containing gas, at a temperature, $T_c$, and for a time, $t_c$, sufficient to form a dielectric ceramic powder; d. forming a green body from said dielectric ceramic powder of step c; and f. heating said green body in the presence of an oxygen containing gas, at a temperature, $T_s$, and for a time, $t_s$, sufficient to form said dielectric ceramic material. The above process can typically be used with an admixture of ZnO and/or $CaCO_3$ powders with said powders in step b, whereby a material having a composition represented by the formula, $$(Bi_{1-z}Cz_z)_{2-x}(Zn_{(2+y)/3}Nb_{4/3})O_{7-3x/2+y/3+xz/2-z}$$

and $0 \leq x \leq 0.667$, $0 \leq y \leq 0.300$, and $0 \leq z \leq 0.200$ is produced. In another embodiment typically only excess ZnO is added and mixed in step b, whereby the material produced has a composition represented by the formula, $$Bi_{2-x}(Zn_{(2+y)/3}Nb_{4/3})O_{7-3x/2+y/3}$$

and $0 \leq x \leq 0.667$, $0 < y \leq 0.300$; however more preferable is $0.240 \leq x \leq 0.333$ and $0.120 \leq y \leq 0.300$; and most preferable is $0.25 \leq x \leq 0.30$ and $0.15 \leq y \leq 0.25$. In some embodiments the above processes typically include: (a) substituting for Bi, dopants selected from the group consisting of Ca, Sr, Ba, Y, Pb, Cd, La and other rare earth elements having atomic numbers 58-71 of the periodic table, whereby said dopants comprise less than 20 mol % based on Bi content; (b) substituting for Zn, dopants selected from the group consisting of Mg, Ca, Co, Mn, Ni, and Cu, whereby said dopants comprise less than 20 mol % based on Zn content; and (c) substituting for Nb, dopants selected from the group consisting of Sn, Ti, Zr, Hf, and Ta, whereby said dopants comprise less than 20 mol % based on Nb content; however, more preferable are substitutions for Bi, Zn, or Nb that are each less than 10 mol % based on Bi, Zn, or Nb content respectively. The sintering temperature is typically, $T_s < 1100°$ C. Yet further typical embodiments include the compositions obtained from the above processes. The compositions typically produced by the above processes have electrical characteristics comprising:

Dielectric constant: $\epsilon_r = 80$ to 145
Temperature dependence of $\epsilon$: $T_\epsilon = -360$ to 200 ppm/°C.
Temperature dependence of resonant frequency: $|T_f| \leq 200$ ppm/°C.
Tan δ at 100 kHz: tan δ < 0.0002
Product of Microwave Q·f, (1-5 GHz): Q·f > 1000 GHz;

and more preferably have electrical characteristics comprising:

Dielectric constant: $\epsilon_r = 90$ to 110
Temperature dependence of resonant frequency: $|T_f| \leq 20$ ppm/°C.
Product of Microwave Q·f, (1-5 GHz): Q·f < 5000 GHz.

In yet another typical embodiment the dielectric constant, $\epsilon_r \geq 100$, and product of Microwave Q·f (at 1-5 GHz) ≥ 5000 GHz. The materials typically have densities greater than 90% of the theoretical density.

A further embodiment of the invention typically comprises a process for making a dielectric ceramic material including: a. mixing precursor powders selected from the group consisting of $Bi_2O_3$, $ZnNb_2O_6$, ZnO, $Nb_2O_5$, $CaCO_3$, and mixtures thereof, and calcining to form a single-phase powder with a T-BZN structure; b. mixing precursor powders selected from the group consisting of $Bi_2O_3$, $ZnNb_2O_6$, ZnO, $Nb_2O_5$, $CaCO_3$, and mixtures thereof, and calcining to form a single-phase powder with a C-BZN structure; c. mixing said single phase T-BZN and said single phase C-BZN powders; d. forming a green body from said mixed powders; and e. heating said green body in the presence of an oxygen containing gas and sintering at a temperature, $T_s$, and for a time, $t_s$, sufficient to form said dielectric ceramic material. It is understood of course that at least one each of a Bi, Zn, and Nb containing compound is selected or a BZN compound would not be formed. Typically the precursors in step a are selected to obtain said single-phase powder with a T-BZN structure, having a stoichiometry represented by the formula,

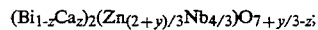

$(Bi_{1-z}Ca_z)_2(Zn_{(2+y)/3}Nb_{4/3})O_{7+y/3-z};$ whereby $0 \leq y \leq 0.300$, and $0 \leq z \leq 0.200$; and the precursors in step b is selected to obtain said single-phase powder with a C-BZN structure, having a stoichiometry represented by the formula,

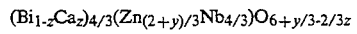

$(Bi_{1-z}Ca_z)_{4/3}(Zn_{(2+y)/3}Nb_{4/3})O_{6+y/3-2/3z}$ whereby $0 \leq y \leq 0.300$, and $0 \leq z \leq 0.200$. In some embodiments the above process typically includes substitutions in step a, step b, or both by: (a) substituting for Bi, dopants selected from the group consisting of Ca, Sr, Ba, Y, Pb, Cd, La and other rare earth elements having atomic numbers 58-71 of the periodic table, whereby said dopants comprise less than 20 mol % based on Bi content; (b) substituting for Zn, dopants selected from the group consisting of Mg, Ca, Co, Mn, Ni, and Cu, whereby said dopants comprise less than 20 mol % based on Zn content; and (c) substituting for Nb, dopants selected from the group consisting of Sn, Ti, Zr, Hf, and Ta, whereby said dopants comprise less than 20 mol % based on Nb content; however, more preferably the process includes substitutions for Bi, Zn, or Nb that are each less than 10 mol % based on Bi, Zn, or Nb content respectively. Other typical embodiments include a process where the precursors are selected to obtain a composition represented by the formula,

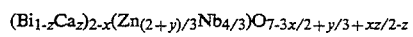

$(Bi_{1-z}Ca_z)_{2-x}(Zn_{(2+y)/3}Nb_{4/3})O_{7-3x/2+y/3+xz/2-z}$ whereby $0 < x < 0.667$, $0 \leq y \leq 0.300$, and $0 \leq z \leq 0.200$; more preferably whereby $0.240 \leq x \leq 0.333$, $0.120 \leq y \leq 0.300$, and $0 \leq z \leq 0.200$; and most preferably $0.25 \leq x \leq 0.30$, $0.15 \leq y \leq 0.25$, and $0 \leq z \leq 0.10$. Yet further typical embodiments include the compositions obtained from the above processes. The compositions typically produced by the above processes typically have electrical characteristics comprising:

Dielectric constant: $\epsilon_r = 80$ to 145
Temperature dependence of $\epsilon$: $T_\epsilon = -360$ to 200 ppm/°C.
Temperature dependence of resonant frequency: $|T_f| \leq 200$ ppm/°C.
Tan δ at 100 kHz: tan δ < 0.0002
Product of Microwave Q·f, (1-5 GHz): Q·f > 1000 GHz;

and more preferably have electrical characteristics comprising:

Dielectric constant: $\epsilon_r = 90$ to 110
Temperature dependence of resonant frequency: $|T_f| \leq 20$ ppm/°C.
Product of Microwave Q·f, (1-5 GHz): Q·f ≥ 5000 GHz.

In yet another typical embodiment the dielectric constant, $\epsilon_r \geq 100$, and product of Microwave Q·f (at 1-5 GHz) ≥ 5000 GHz. The materials typically have densities greater than 90% of the theoretical density.

In other typical embodiments using the above processes, the provided $ZnNb_2O_6$ can be obtained by the process of mixing ZnO and $Nb_2O_5$ precursor powders and calcining at a temperature sufficient to obtain said $ZnNb_2O_6$ precursor powder with columbite structure.

The above processes typically have processing temperatures, $T_c < 1050°$ C. and/or $T_s < 1100°$ C. Preferred calcination temperatures are 750° C. to 1000° C. and most preferred are 800°-900° C. Preferred sintering temperatures are 950° C. to 1100° C. and most preferred are 950°-1000 ° C. The preferred atmosphere is oxygen, although air can be used under some conditions as taught herein. The columbite precursor method, using $ZnNb_2O_6$, of making the compositions is preferred; although the method of preparation from mixed single phase T-BZN and C-BZN powders or the method of preparation from conventional mixed-oxides can also be used.

DETAILED DESCRIPTION OF THE INVENTION AND BEST MODE

Figure 1:
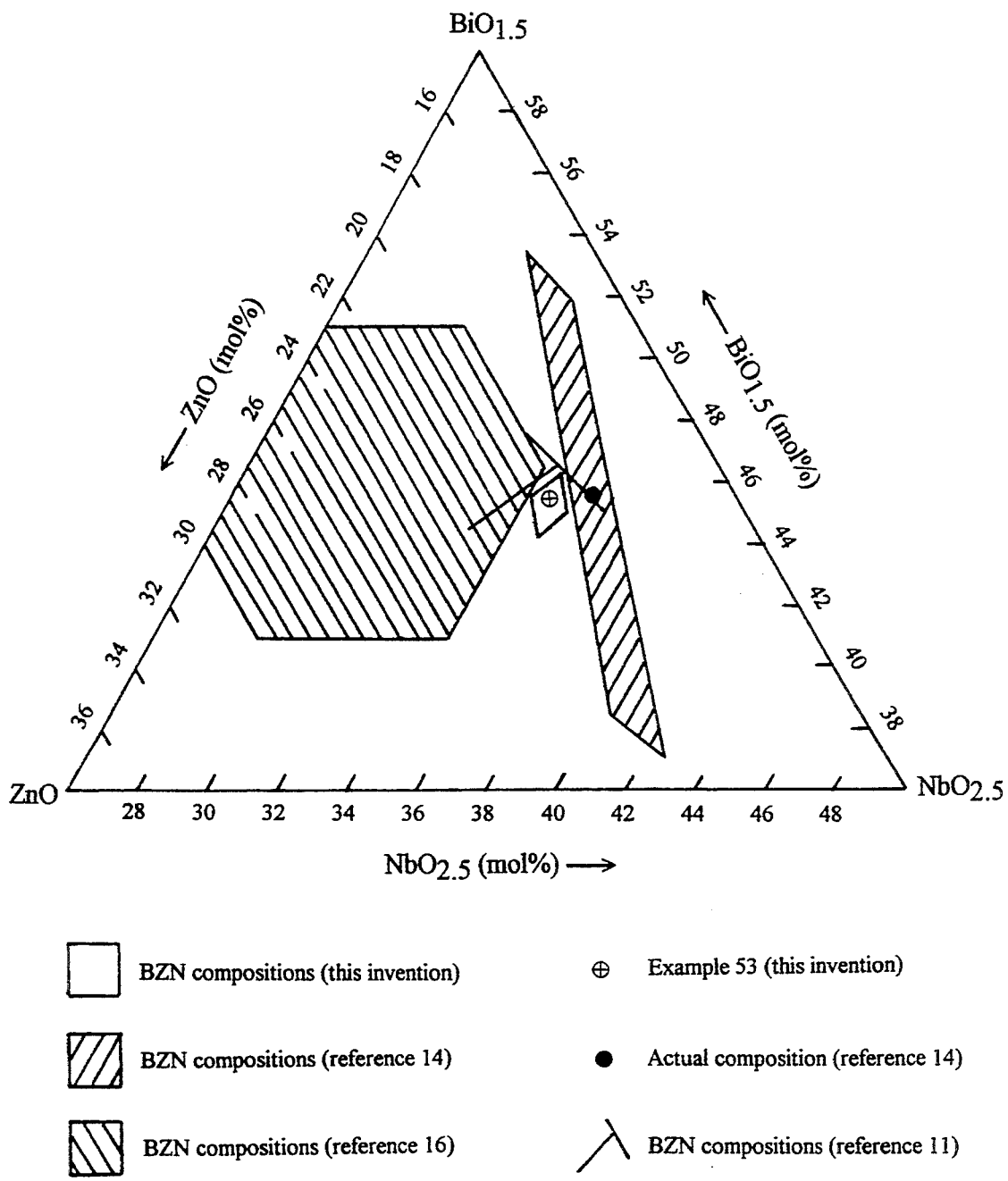
FIG. 1 is a ternary phase diagram of the $Bi_2O_x$—$ZnO$—$Nb_2O_5$ (BZN) system showing the compositions of the BZN ceramics of the first embodiment of the present invention, as well as some of the BZN compositions known in the art.

This invention generally relates to the preparation of superior microwave dielectric ceramics in the $Bi_2O_3$—$ZnO$—$Nb_2O_5$ (BZN) compositional system. The BZN ceramics of the invention typically exhibit high relative dielectric permittivity, $\epsilon_r \approx 100$ and higher; temperature-compensated dielectric behavior, $|T_\epsilon| < 20$ ppm/°C. and $|T_f| < 10$ ppm/°C.; extremely low dielectric loss at low frequency, tan $\delta < 0.0002$ at 100 kHz; and extremely low dielectric loss at microwave frequencies, Q·f products greater than 5000 GHz.

The BZN ceramic contains two crystalline phases, a tetragonal phase with nominal composition $Bi_2(Zn_{2/3}Nb_{4/3})O_7$ (T-BZN) and a cubic pyrochlore phase with nominal composition $Bi_{4/3}(Zn_{2/3}Nb_{4/3})O_6$ (C-BZN). These single phase compositions were isolated and their properties measured as shown in Table I:

TABLE I

| COMPARISON OF T-BZN AND C-BZN PHASES | | |
|---|---|---|
| Property | T-BZN Phase | C-BZN Phase |
| Stoichiometry: | $Bi_2(Zn_{2/3}Nb_{4/3})O_7$ | $Bi_{4/3}(Zn_{2/3}Nb_{4/3})O_6$ |
| Crystal Structure: | Pseudo-Tetragonal $a \approx 15.1$ Å, $c \approx 21.6$ Å | Cubic Pyrochlore $a \approx 10.55$ Å |
| Calcination Temp.: | 800 to 850° C. | 900 to 1000° C. |
| Sintering Temperature: | 950 to 1000° C. | 1100° C. |
| Sintered Density: | $\rho \approx 7.60$ g/cm$^3$ | $\rho \approx 7.00$ g/cm$^3$ |
| Dielectric Constant: | $\epsilon_r \approx 80$ | $\epsilon_r \approx 145$ |
| Temperature Coeff.: | $\tau_\epsilon \approx +200$ ppm/°C. | $\tau_\epsilon \approx -360$ ppm/°C. |
| Dielectric Loss: (1 kHz to 100 kHz) | tan $\delta < 0.0002$ | tan $\delta < 0.0002$ |

BZN compositions intermediate to the T-BZN and C-BZN stoichiometries are represented by the formula, $$Bi_{2-x}(Zn_{2/3}Nb_{4/3})O_{7-3x/2} \qquad \text{Formula 1}$$

$$(0 < x < 0.667)$$

where x=0 corresponds to the T-BZN phase and x=0.667 corresponds to the C-BZN phase. BZN ceramics with compositions intermediate to x=0 and x=0.667 contain both the T-BZN and C-BZN phases, their relative proportions determined by the value of x in the above formula. Thus, it is possible to achieve temperature compensation of the dielectric permittivity by adjusting the ratio of positive-$T_\epsilon$ T-BZN and negative-T C-BZN phases simply by modifying the $Bi_2O_3$ content relative to the other constituents. It was found that the dielectric properties of stoichiometric BZN ceramics (represented by Formula 1) were inferior, due to the presence of undesired Bi—Nb oxide phases (e.g., $BiNbO_4$ and $Bi_5Nb_3{15}$) in calcined powders and sintered ceramics. The formation of these Bi—Nb oxide phases made it difficult to control the ratio of T-BZN and C-BZN phases and led to increased dielectric losses.

A first embodiment of this invention relates to the addition of excess ZnO to the BZN composition, as defined by the formula, $$Bi_{2-x}(Zn_{(2+y)/3}Nb_{4/3})O_{7-3x/2+y/3} \qquad \text{Formula 2}$$

where $0.240 \leq x \leq 0.333$ and $0.120 \leq y \leq 0.300$.

When excess ZnO is added to the BZN composition (i.e., when y>0), Bi—Nb oxide phase formation is suppressed, resulting in a significant improvement in dielectric properties. Thus, BZN ceramics with controlled amounts of the T-BZN and C-BZN phases, and without any other phases, can be prepared. Modifying the value of x in the above formula affects the ratio of T-BZN and C-BZN phases in the BZN ceramics. Thus, when $x \approx 0.27$ (and $y \approx 0.20$), BZN ceramics exhibit temperature-compensated dielectric permittivity (with $\epsilon_r \approx 100$), due to dielectric mixing between the positive $T_\epsilon$ of the T-BZN phase and the negative $T_\epsilon$ of the C-BZN phase. These BZN ceramics also exhibit extremely low dielectric loss (e.g. tan $\delta < 0.0002$ at 100 kHz), good temperature stability (e.g. $T_\epsilon \approx -17$ ppm/°C.), and excellent microwave loss quality (e.g. Q·f $\approx$ 5000 GHz).

The compositions of the BZN ceramics represented by Formula 2 are compared with BZN compositions of other workers in the ternary diagram in FIG. 1. The range of BZN compositions as defined by Formula 2, falls outside the ranges of BZN compositions evaluated by other workers. See, for example, references (11), (14) and (16) cited above. Reference 11 discloses BZN compositions shown by the two straight lines. Reference 14, discloses the BZN compositions shown left hand shaded area. The actual BZN material made in reference 14 as illustrated in FIG. 1 is located at only one point indicated by the black dot within the right hand shaded area. The shaded area indicated for reference 14 in FIG. 1 is for comparison only since it is actually for a BZN material that also contains nickel and thus is not actually on the plane shown.

A second embodiment of this invention involves the modification of the BZN composition by CaO substitution for $Bi_2O_3$, according to the formula,

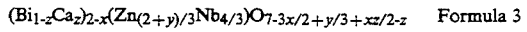

$$(Bi_{1-x}Ca_z)_{2-x}(Zn_{(2+y)/3}Nb_{4/3})O_{7-3x/2+y/3+xz/2-z} \quad \text{Formula 3}$$

where $0 < x < 0.667$, $0 \leq y \leq 0.300$, and $0 < z \leq 0.200$
Calcium has the effect of reducing dielectric loss. A BZN ceramic prepared with $x=0.267$, $y=0.20$, and $z=0.02$ exhibited the following properties: $\epsilon_r \approx 104$, $T_\epsilon \approx -52$ ppm/°C., Q·f$\approx$5400 GHz.

The compositions of the BZN ceramics represented by Formula 3 differ from those reported by other workers, see for example reference (15) cited above. These workers evaluated dielectric ceramics with the composition represented by $Bi_{18}(Ca_{1-x}Zn_x)_8Nb_{12}O_{65}$, which falls outside the range of calcium-modified BZN compositions represented by Formula 3.

A third typical embodiment of this invention involves the preparation of the BZN ceramics by a two-step process involving pre-reaction of the ZnO and $Nb_2O_5$ to form an intermediate columbite-structured $ZnNb_2O_6$ powder, and then mixing $Bi_2O_3$ with $ZnNb_2O_6$ (and also when wanted ZnO and/or $CaCO_3$) to form the desired compositions according to Formula 3. The powder mixtures are then calcined at temperatures between 800° and 900° C., and then processed into BZN ceramics by sintering at temperatures near 1000° C. The pre-reaction of $ZnNb_2O_6$, prior to mixing with $Bi_2O_3$, minimizes the formation of undesired bismuth-niobium oxide phases (e.g., $BiNbO_4$ and $Bi_5Nb_3O_{15}$) during calcination and improves sintered densities of the BZN ceramics, thus allowing the preparation of useful dielectric ceramics.

A fourth typical embodiment of this invention involves the preparation of dielectric ceramics from mixtures of single-phase T-BZN and C-BZN powders. These single-phase, end-member powders are prepared with the desired T-BZN or C-BZN stoichiometries by mixing $Bi_2O_3$ and $ZnNb_2O_6$, along with ZnO and/or $CaCO^3$, and then calcining these powders at temperatures in the range of 800° C. to 1000° C. These single phase, calcined powders are then mixed in appropriate ratios to provide overall compositions in the desired range, according to Formula 3. These powder mixtures then are processed into BZN ceramics by sintering at temperatures near 1000° C. This approach allows for improved control over the formation of BZN ceramics with desired ratios of T-BZN and C-BZN phases.

The BZN ceramics of this invention were prepared using the standard ceramic processing methods of ball milling, calcination, uniaxial and isostatic pressing, and sintering. These BZN ceramics were densified with a relatively low sintering temperature of 1000° C. Properties of the BZN ceramics were improved when the calcination and sintering operations were performed in oxygen atmospheres.

The significance of the current invention can be seen from Table II by comparing the $\epsilon_r$ and Q·f products achieved in the present BZN ceramics (Examples 53 and 54) with similar data obtained in other temperature-compensated, high-permittivity microwave dielectric ceramics.

Compared to previously reported dielectric ceramics in the BZN system, the present invention provides BZN ceramics with equivalent or better dielectric permittivity and substantially better microwave loss quality, Q·f$\approx$5000 GHz versus Q·f$\leq$2000 GHz. Compared to previously reported work in high-permittivity microwave dielectric ceramics in non-BZN systems, the BZN ceramics of the present invention have higher permittivity ($\epsilon_r \approx 100$ versus $\epsilon_r \leq 90$) and equivalent microwave loss quality.

TABLE II

COMPARISON OF DIELECTRIC PROPERTIES

| Composition | $\epsilon_r$ | $\tau_f$(ppm/°C.) | Q · f (GHz) | Reference |
|---|---|---|---|---|
| $Bi_{1.73}(Zn_{0.73}Nb_{4/3})O_{6.67}$ | 101 | < +10 | 5,000 | Example 53 |
| $(Bi_{1.70}Ca_{0.035})(Zn_{0.73}N_{4/3})O_{6.65}$ | 104 | < +25 | 5,400 | Example 54 |
| $Bi_2O_3$—ZnO—$Nb_2O_5$ | 90–130 | — | 200–1,000 | (15) |
| $Bi_{18}Ca_8Nb_{12}O_{65}$ | 59 | — | 2,260 | (16) |
| BaO—$Sm_2O_3$—$TiO_2$ | 75–92 | −17 to +21 | 4,000–8,000 | (4) |
| BaO—$La_2O_3$—$Sm_2O_3$—$TiO_2$ | 80 | +2 | 7,200 | (4) |
| BaO—PbO—$Nd_2O_3$—$TiO_2$ | 90 | 0 | 6,000 | (4) |
| BaO—PbO—$Nd_2O_3$—$TiO_2$ | 88 | 0 | 5,000 | (7) |
| BaO—PbO—$La_2O_3$—$TiO_2$ | 82 | +100 | 16,000 | (9) |
| BaO—SrO—$Sm_23$—$TiO_2$ | 80 | 0 | 11,000 | (8) |
| BaO—$Bi_2O_3$—$Nd_2O_3$—$TiO_2$ | 88 | +8 | 5,200 | (10) |

EXAMPLES

The following examples, illustrative of the novel compositions of the invention and the methods of preparing them, are given without any intention that the invention be limited thereto.

Figure 2:
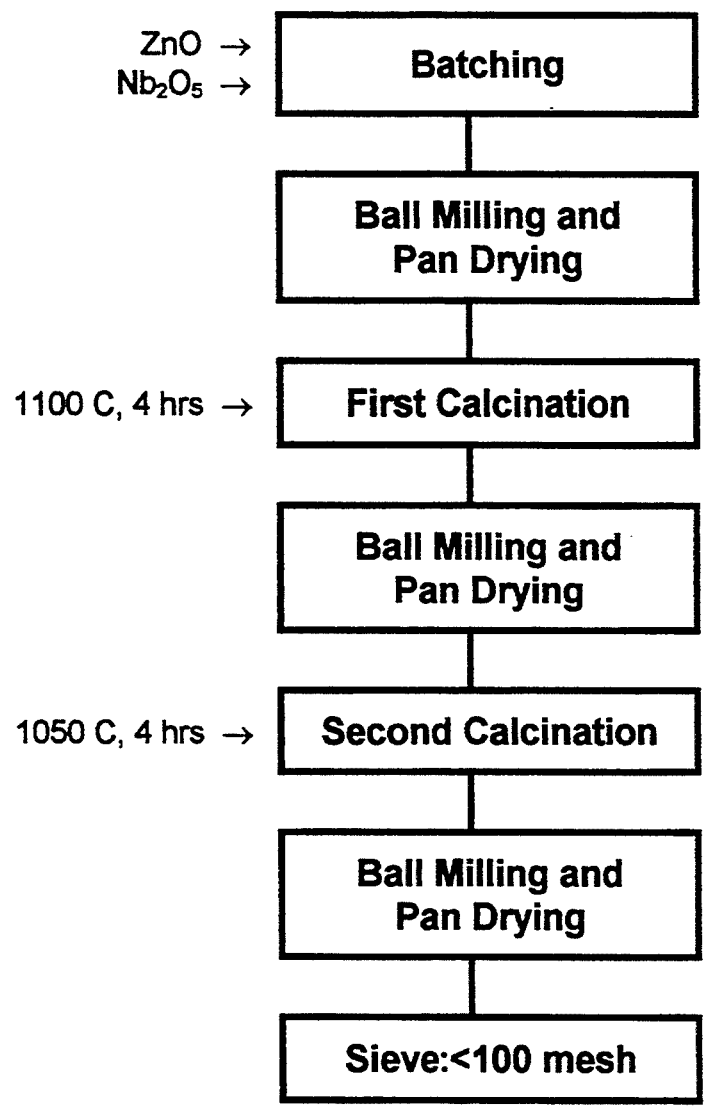
FIG. 2 depicts the typical steps used in the examples for the preparation of the $ZnNb_2O_6$ precursor.
Figure 3:
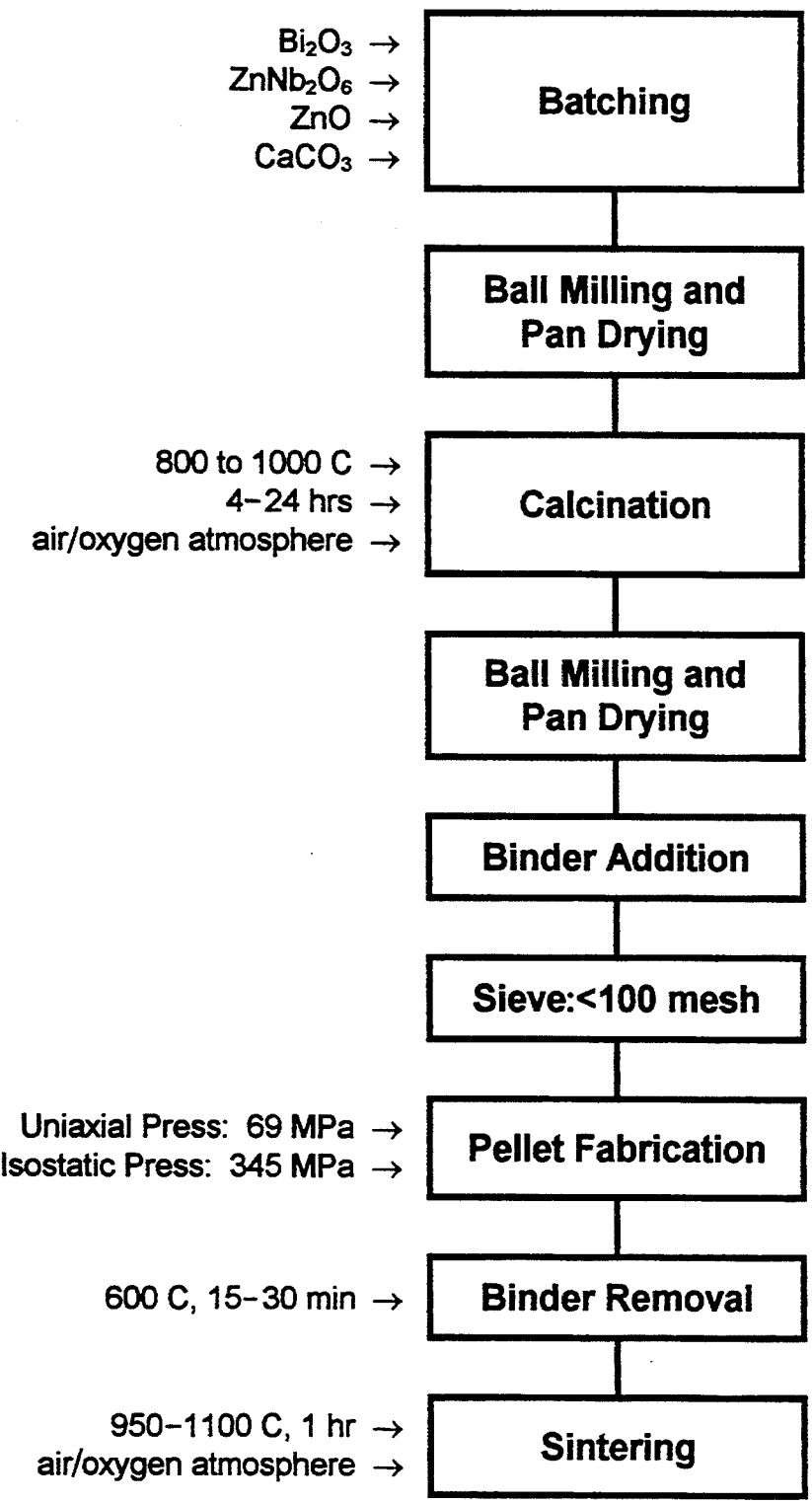
FIG. 3 depicts the typical steps in the preparation of BZN ceramics described in the examples.

The compositions of the example $ZnNb_2O_6$ and BZN ceramics are described in Table III. In most cases, the BZN ceramics were prepared using a two-step fabrication approach whereby a columbite $ZnNb_2O_6$ precursor was first prepared and then combined with $Bi_2O_3$. The generalized methods used for the fabrication of the zinc niobate precursor powder and the BZN powders and ceramics are shown in FIGS. 2 and 3 respectively.

The BZN powders were prepared from $Bi_2O_3$, $ZnNb_2O_6$, ZnO, $Nb_2O_5$ and/or $CaCO_3$ powders. The raw materials used for the fabrication of the example BZN ceramics were the following:
$Bi_2O_3$: Aldrich, 99.9% pure
ZnO: Baker Analyzed Reagent Grade
$Nb_2O_5$: Johnson Matthey, 99.5% pure
$CaCO_3$: CFS Chemicals.

The batches were slurried in ethanol, and wet milled for 12 hours in nalgene jars with zirconia grinding media. After milling, the powders were pan dried at room temperature and then crushed to a fine powder in a mortar and pestle.

The $ZnNb_2O_6$ precursor powders were calcined in air 1100° C. for four hours in high-density alumina crucibles. The BZN powders were calcined at temperatures ranging from 800° to 1000° C. (depending on composition) in high-density alumina crucibles, either in air or flowing oxygen atmospheres. Heating rates were 200° C./hr and the hold times ranged from 4 to 24 hours. After calcining, the powders were wet milled and dried, as described above.

To facilitate pellet fabrication, an organic binder (KD-2, supplied by ICI) was added to the BZN powder. A 1 wt % addition of the KD-2 binder was made by adding an appropriate amount of a 10 wt % KD-2 ethanol solution, and hand-mixing in an agate mortar and pestle. After the ethanol evaporated, the BZN powder was sieved through a 100 mesh sieve.

Discs of approximately 1.2 grams in weight, were prepared using a two-step method. Discs were uniaxially pressed in a 1.4 cm die at 69 MPa, and then loaded into rubber bags and cold isostatically pressed at 345 Mpa. This method typically provided green body densities in excess of 60 percent theoretical. Binder was removed from the green discs by heating the discs to 600° C. for one hour.

The BZN discs were sintered at temperatures ranging from 950° C. to 1100° C. (depending on composition) on a bed of zirconia grain, either in air or flowing oxygen atmospheres. Heating rates were 200° C./hr and the hold time typically was one hour. Sample weights were recorded prior to and after sintering; in most cases, the weight loss due to $Bi_2O_3$ volatilization was insignificant (less than 0.20 wt %).

After sintering, pellets were polished on 240-grit SiC paper to within 0.03 mm parallelism, so accurate geometric measurements could be made for both density and dielectric constant calculations. At least 0.1 mm of each pellet face was removed so that any surface effects could be eliminated. Densities were calculated from measurements of geometry diameter and thickness and weight. The accuracy of these geometrical density measurements are estimated to be ±0.05 g/cm$^3$. Data reported are averages of two or three samples.

The calcined BZN powders and sintered BZN ceramics were evaluated by X-ray diffraction (XRD), using a computer controlled Rigaku Dmax II XRD system. The XRD patterns were analyzed by comparing the major peak intensities of the various phases present. Lattice parameters were calculated using standard methods.

The microstructure of sintered BZN ceramics were evaluated by scanning electron microscopy (SEM), using a JEOL model 740 SEM system. Prior to SEM evaluation, samples were polished to one micron diamond finish, then thermally etched by heating the samples to temperatures 50° C. below their sintering temperature for 15 minutes. Both secondary electron and backscatter electron mode micrographs were taken, so that contrast due to different phases could be differentiated.

Sputtered gold electrodes were applied, and the dielectric properties were measured using a HP-7274A LCR meter. The capacitance and dissipation factors, tan δ, were measured over the frequency range of 1 kHz to 100 kHz and temperature range of −150° C. to 100° C. Room temperature measurements were also made to improve accuracy of tan δ values. Dielectric constants were calculated from the capacitance, using the equation:

$$\epsilon_r = (C/\epsilon_o)(t/A)$$

where, C is the capacitance in pF; $\epsilon_o$ is the permittivity of free space, 8.85 pF/m; t is the sample thickness in m, and A is the sample area in m$^2$. Temperature coefficients of the dielectric constant, $T_\epsilon$, were calculated from the values of $\epsilon_r$ at temperatures of 0° and 50° C., with no correction for thermal expansion. Data reported are averages of two to three samples.

Measurements of the dielectric constant at microwave frequencies were made using the post-resonator method described in the literature. See for example: (17) B. W. Hakki and P. P. Coleman, IEEE Transactions on Microwave Theory and Technology MTT-8, 402–410 (1960); (18) W. E. Courtney, IEEE Transactions on Microwave Theory and Technology MTT-18, 476–485 (1970). For these measurements, cylindrical samples, nominally 2-cm diameter and 1.75-cm length, of BZN ceramics of Examples 53 and 54 were prepared using the methods described earlier.

Measurements of dielectric loss at microwave frequencies were made by the high Q resonant method described in the literature. See for example: (19) R. O. Bell and G. Rupprecht, IEEE Transactions on Microwave Theory and Technology MTT-9, 239 (1961); (20) J. K. Plourde, et al., Journal of the American Ceramic Society 58, 418 (1975). For this measurement, disc-shaped samples, nominally 1-cm diameter and 0.4 cm thick, of BZN ceramics of Examples 53 and 54 were prepared using methods described herein.

TABLE III

$ZnNb_2O_6$ AND BZN COMPOSITIONS

| Example | Composition | Description of Composition | $ZnNb_2O_6$ Precursor |
|---|---|---|---|
| *Columbite $ZnNb_2O_6$ Precursors Powders* | | | |
| 7 | $ZnNb_2O_6$ | single calcine method | — |
| 34 | $ZnNb_2O_6$ | double calcine method | — |
| 51 | $Zn_{1.10}Nb_2O_{6.10}$ | double calcine method | — |
| *$(Bi_{1-z}Ca_z)_2(Zn_{2+y}/3Nb_{4/3})O_{7+y/3-z}$ (T-BZN) Ceramics* | | | |
| 44 | $Bi_{2.00}(Zn_{0.67}Nb_{4/3})O_{7.00}$ | y = 0, z = 0 | 34 |
| 45 | $(Bi_{1.90}Ca_{0.10})(Zn_{0.67}Nb_{4/3})O_{6.95}$ | y = 0, z = 0.05 | 34 |
| 52 | $Bi_{2.00}(Zn_{0.73}Nb_{4/3})O_{7.07}$ | y = 0.20, z = 0 | 34 |
| *$(Bi_{1-z}Ca_z)_{4/3}(Zn_{2+y}/3Nb_{4/3})O_{6+2y/3-2z/3}$ (C-BZN) Ceramics* | | | |
| 28 | $Bi_{1.333}(Zn_{0.67}Nb_{4/3})O_{6.00}$ | y = 0, z = 0 | 7 |
| 42 | $Bi_{1.333}(Zn_{0.73}Nb_{4/3})O_{6.07}$ | y = 0.20, z = 0 | 34 |
| 43 | $Bi_{1.333}(Zn_{0.70}Nb_{4/3})O_{6.03}$ | y = 0.10, z = 0 | 34 |
| 46 | $(Bi_{1.27}Ca_{0.067})(Zn_{0.70}Nb_{4/3})O_{6.00}$ | y = 0.10, z = 0.05 | 34 |
| *$(Bi_{1-z}Ca_z)_{2-x}(Zn_{(2+y)/3}Nb_{4/3})O_{72-3x/2+y/3+xz/2-z}$ (BZN) Ceramics: Prepared from $Bi_2O_3$ and $ZnNb_2O_6$* | | | |
| 39 | $Bi_{1.67}(Zn_{2/3}Nb_{4/3})O_{6.50}$ | x = 0.333, y = 0, z = 0 | 34 |
| 40 | $Bi_{1.73}(Zn_{2/3}Nb_{4/3})O_{6.60}$ | x = 0.267, y = 0, z = 0 | 34 |
| 41 | $Bi_{1.80}(Zn_{2/3}Nb_{4/3})O_{6.70}$ | x = 0.200, y = 0, z = 0 | 34 |
| 53 | $Bi_{1.73}(Zn_{0.73}Nb_{4/3})O_{6.67}$ | x = 0.267, y = 0.20, z = 0 | 34 |
| 54 | $(Bi_{1.70}Ca_{0.035})(Zn_{0.73}Nb_{4/3})O_{6.65}$ | x = 0.267, y = 0.20, z = 0.02 | 34 |
| 56 | $Bi_{1.67}(Zn_{0.73}Nb_{4/3})O_{6.57}$ | x = 0.333, y = 0.20, z = 0 | 51 |
| *$(Bi_{1-z}Ca_z)_{2-x}(Zn_{(2+y)/3}Nb_{4/3})O_{7-3x/2+y/3+xz/2-z}$ (BZN) Ceramics: Prepared from Oxides* | | | |
| 57 | $Bi_{1.67}(Zn_{0.73}Nb_{4/3})O_{6.57}$ | x = 0.333, y = 0.20, z = 0 | — |
| *$(Bi_{1-z}Ca_z)_{2-x}(Zn_{(2+y)/3}Nb_{4/3})O_{7-3x/2+y/3+xz/2-z}$ (BZN) Ceramics: Mixtures of Calcined Powders* | | | |
| 47 | 60 mol % BZN #44 + 40 mol % BZN #42 | x = 0.27, y = 0.08, z = 0 | — |
| 48 | 50 mol % BZN #44 + 50 mol % BZN #42 | x = 0.333, y = 0.10, z = 0 | — |
| 49 | 60 mol % BZN #45 + 40 mol % BZN #42 | x = 0.27, y = 0.08, z = 0.03 | — |
| 50 | 60 mol % BZN #45 + 40 mol % BZN #46 | x = 0.27, y = 0.04, z = 0.05 | — |

EXAMPLES 7, 34, 51

The $ZnNb_2O_6$ powder batch of Example 7 was prepared using the wet-milling and calcination procedures described above, with a calcination temperature of 1100° C. and a four-hour hold time, followed by wet-milling and sieving through 100 mesh. For the $ZnNb_2O_6$ powder batches of Examples 34 and 51, a double-calcination method was employed to assure optimum crystallinity and phase purity. For these batches, the powders were wet milled after the first calcination at 1100° C., and then calcined a second time at 1050° C. for four hours, and wet-milled and sieved through 100 mesh. The $ZnNb_2O_6$ powder of Example 51 was batched with 10 mol % excess ZnO.

EXAMPLES 44, 45, 52

T-BZN ceramics were prepared as described above with the following compositions:

Ex. 44: Stoichiometric: $Bi_2(Zn_{2/3}Nb_{4/3})O_7$

Ex. 45: 5 mol % CaO substitution of $Bi_2O_3$: $(Bi_{1.90}Ca_{0.10})(Zn_{2/3}Nb_{4/3})O_{6.95}$ Ex. 52: 10 mol % excess ZnO: $Bi_2(Zn_{0.733}Nb_{4/3})O_{7.067}$.

These T-BZN powders were calcined at 850° C. for eight hours in flowing oxygen. Pellets prepared from these T-BZN powders were sintered at 1000° C. for one hour in flowing oxygen.

XRD peaks for the T-BZN phase in the sintered T-BZN ceramic of Example 52, were indexed to a pseudo-tetragonal cell with a $\approx$15.10 Å and c$\approx$21.60 Å. Indexing of this phase was insufficient to account for all of the XRD peaks, but the same peaks occurred with the same relative intensities in all of the T-BZN ceramics produced. Thus, it can be assumed that $Bi_2(Zn_{2/3}Nb_{4/3})O_7$ is a single-phase composition and that the T-BZN phase may have a lower symmetry than tetragonal.

X-ray diffraction data for T-BZN powders and ceramics of Examples 44, 45, and 52 are presented in Tables IV (A) and IV (B).

TABLE IV

(A). XRD RESULTS: CALCINED T-BZN MD C-BZN POWDERS

| | | Calcination Conditions | | | Phase Constitution ($I_{rel}$ %) | | |
|---|---|---|---|---|---|---|---|
| Example | Composition | T(°C.) | t(hr) | atm | T-BZN | T-BZN | Bi—Nb Oxide |
| *T-BZN Ceramics* | | | | | | | |
| 10 | $Bi_{2.00}(Zn_{0.67}Nb_{4/3})O_{7.00}$ | 800 | 24 | air | 100 | 0 | 3 |
| 44 | $Bi_{2.00}(Zn_{0.67}Nb_{4/3})O_{7.00}$ | 800 | 8 | oxygen | 100 | 0 | 2 |
| | | 900 | 8 | oxygen | 100 | 0 | 0 |
| 45 | $(Bi_{1.90}Ca_{0.10})(Zn_{0.67}Nb_{4/3})O_{6.95}$ | 800 | 8 | oxygen | 100 | 0 | 2 |
| | | 900 | 8 | oxygen | 100 | 0 | 0 |
| 52 | $Bi_{2.00}(Zn_{0.73}Nb_{4/3})O_{7.07}$ | 850 | 8 | oxygen | 100 | 0 | 2 |
| *C-BZN Ceramics* | | | | | | | |
| 28 | $Bi_{1.333}(Zn_{0.67}Nb_{4/3})O_{6.00}$ | 800 | 24 | oxygen | 76 | 100 | 21 |
| 43 | $Bi_{1.333}(Zn_{0.70}Nb_{4/3})O_{6.03}$ | 900 | 8 | oxygen | 0 | 100 | 11 |
| | | 1000 | 8 | oxygen | 0 | 100 | 5 |
| 42 | $Bi_{1.333}(Zn_{0.73}Nb_{4/3})O_{6.07}$ | 900 | 8 | oxygen | 0 | 100 | 2 |

TABLE IV-continued
(A). XRD RESULTS: CALCINED T-BZN MD C-BZN POWDERS

| Example | Composition | Calcination Conditions | | | Phase Constitution ($I_{rel}$ %) | | |
|---|---|---|---|---|---|---|---|
| | | T(°C.) | t(hr) | atm | T-BZN | T-BZN | Bi—Nb Oxide |
| 46 | $(Bi_{1.27}Ca_{0.067})(Zn_{0.67}Nb_{4/3})O_{5.97}$ | 1000 | 8 | oxygen | 0 | 100 | 0 |
| | | 900 | 8 | oxygen | 0 | 100 | 7 |
| | | 1000 | 8 | oxygen | 0 | 100 | 0 |

TABLE IV
(B). XRD RESULTS: SINTERED T-BZN AND C-BZN CERAMICS

| Example | Calcination Conditions | | | Sintering Conditions | | | Phase Constitution ($I_{rel}$ %) | | |
|---|---|---|---|---|---|---|---|---|---|
| | T(°C.) | t(hr) | atm | T(°C.) | t(hr) | atm | T-BZN | C-Bzn | Bi—Nb Oxide |
| T-BZN Ceramics | | | | | | | | | |
| 10 | 800 | 24 | air | 1000 | 1 | oxygen | 100 | 0 | 0 |
| 44 | 850 | 8 | oxygen | 1000 | I | oxygen | 100 | 0 | 2 |
| 45 | 850 | 8 | oxygen | 1000 | I | oxygen | 100 | 0 | 2 |
| 52 | 850 | 8 | oxygen | 1000 | I | oxygen | 100 | 0 | 4 |
| C-BZN Ceramics | | | | | | | | | |
| 28 | 800 | 24 | oxygen | 1100 | 1 | air | 0 | 100 | 2 |
| 43 | 1000 | 8 | oxygen | 1100 | 1 | oxygen | 0 | 100 | 0 |
| 42 | 900 | 8 | oxygen | 1100 | 1 | oxygen | 0 | 100 | 0 |
| 46 | 1000 | 8 | oxygen | 1100 | 1 | oxygen | 0 | 100 | 0 |

A small amount (less than 3 percent) of Bi—Nb oxide phase was present in the calcined powders of stoichiometric T-BZN powder (Example 44). This Bi—Nb oxide phase was eliminated and single-phase T-BZN ceramics were prepared by sintering at 1000° C. in oxygen. The stoichiometry variations (Examples 45 and 52) had little or no effect on phase purity in calcined T-BZN powders. However, a small amount (less than five percent) of Bi—Nb oxide phase was present in sintered ceramics of modified T-BZN ceramics.

Figure 4A:
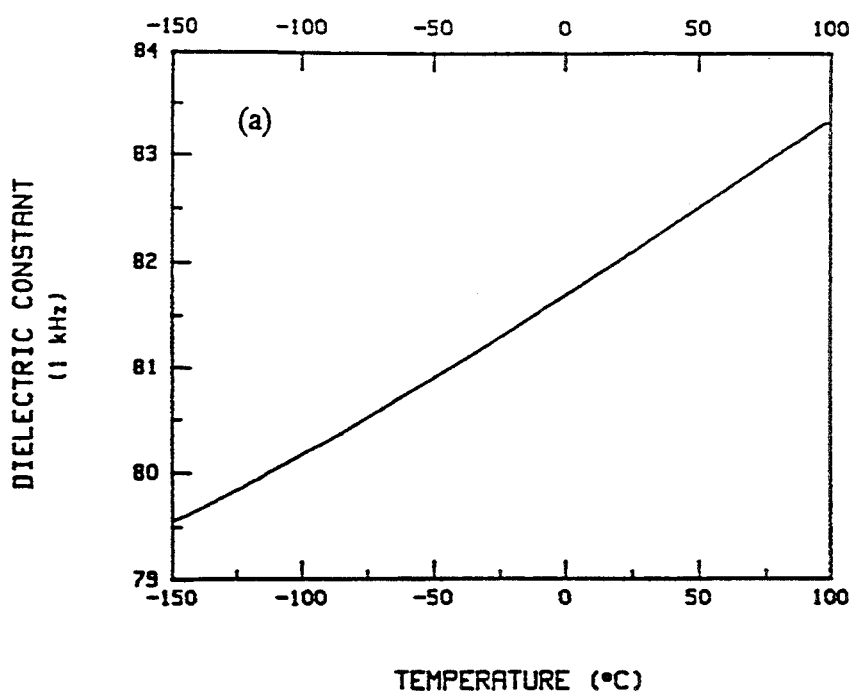
FIG. 4A is a plot showing the dielectric constant at 1 kHz versus temperature for the T-BZN ceramic of Example 52 sintered at 1000° C. for one hour.

Density and dielectric property data for T-BZN ceramics of Examples 44, 45, and 52 are presented in Table V. Stoichiometric T-BZN ceramics (Example 44) sintered to high density at 1000° C. The 5 mol % CaO substitution for $Bi_2O_3$ (Example 45) resulted in significantly lower sintered densities, whereas excess ZnO additions (Example 52) had no effect on densification. The dielectric constant, $\epsilon_r$, of fully-dense T-BZN ceramics ranged from 76 to 84, and the temperature coefficient, $T_\epsilon$, ranged from +200 ppm/°C. to +242 ppm/°C. A typical dielectric constant versus temperature curve for a T-BZN ceramic (Example 52) is presented in FIG. 4A. The 5 mol % substitution of CaO for $Bi_2O_3$ (Example 45) had no effect on either dielectric constant or temperature coefficient. The 10 mol % excess ZnO addition (Example 52) had no effect on $\epsilon_r$, but the temperature coefficient was reduced slightly, from $T_\epsilon = +230$ ppm/°C. to $T_\epsilon = +200$ ppm/°C.; however, this temperature coefficient reduction may not be significant given the limited number of samples evaluated. Compositional modifications had a significant impact on dielectric loss of T-BZN ceramics, with tan $\delta=0.0010$ at 100 kHz for stoichiometric T-BZN ceramics (Example 44), decreasing to tan $\delta=0.0003$ with a 5 mol % CaO substitution for $Bi_2O_3$ (Example 45), and to tan $\delta=0.0001$ with a 10 mol % excess ZnO addition (Example 52).

TABLE V
DENSITY AND DIELECTRIC PROPERTY DATA: T-BZN AND C-BZN CERAMICS

| Example | Density (g/cm³) | Dielectric Properties at 25° C. | | |
|---|---|---|---|---|
| | | $\epsilon_r$ | tan δ (100 kHz) | $\tau_\epsilon$(ppm/°C.) |
| T-BZN Ceramics | | | | |
| 44 | 7.61 | 82 | 0.0011 | +231 |
| 45 | 7.42 | 80 | 0.0004 | +234 |
| 52 | 7.63 | 82 | 0.0001 | +200 |
| C-BZN Ceramics | | | | |
| 28 | 6.69 | 141 | 0.0009 | −355 |
| 43 | 6.94 | 144 | 0.0005 | −357 |
| 42 | 6.98 | 145 | 0.0002 | −363 |
| 46 | 6.86 | 140 | 0.0005 | −356 |

EXAMPLES 28, 42, 43, 46

C-BZN ceramics were prepared as described above with the following compositions:

Ex. 28: Stoichiometric: $Bi_{1.333}(Zn_{0.667}Nb_{4/3})O_{6.00}$

Ex. 43: 5 mol % excess ZnO: $Bi_{1.333}(Zn_{0.700}Nb_{4/3})O_{6.033}$

Ex. 42: 10 mol % excess ZnO: $Bi_{1.333}(Zn_{0.700}Nb_{4/3})O_{6.067}$

Ex. 46: 5 mol % excess ZnO, 5 mol % CaO: $(Bi_{1.27}Ca_{0.067})(Zn_{0.700}Nb_{4/3})O_{6.00}$ The C-BZN powder of Example 28 was calcined at 800° C. for 24 hours in flowing oxygen; the C-BZN powder of Example 42 was calcined at 900° C. for eight hours in flowing oxygen; and the C-BZN powders of Examples 43 and 46 were calcined at 1000° C. for eight hours in flowing oxygen. Pellets prepared from C-BZN powder of Example 28 were sintered at 1100° C. in air, and pellets prepared from C-BZN powders of Examples 42, 43, and 46 were sintered at 1100° C. for one hour in flowing oxygen.

The theoretical density of the C-BZN phase, assuming the $Bi_{4/3}(Zn_{2/3}Nb_{4/3})O_6$ stoichiometry, with the cubic pyrochlore structure ($a_o=10.55$ Å, $Z=8$), is 6.13 g/cm³. However, observed sintered densities were much higher, closer to 7.0 g/cm³, suggesting that the true C-BZN stoichiometry is not $Bi_{4/3}(Zn_{2/3}Nb_{4/3})O_6$. The assumption of a compositionally equivalent stoichiometry of $(Bi_{1.556}Zn_{0.334})(Zn_{0.444}Nb_{1.556})O_7$ leads to a theoretical density of 7.157 g/cm$^3$, which is consistent with densities observed in sintered C-BZN ceramics. The actual C-BZN stoichiometry may differ in the relative amount of Zn occupancy on the Bi sites.

X-ray diffraction data for C-BZN powders and ceramics of Examples 28, 43, 42, and 46 are presented in Tables IV(A) and IV(B). In stoichiometric $Bi_{4/3}(Zn_{2/3}Nb_{4/3})O_6$ ceramics (Example 28), calcined powders were primarily C-BZN phase, but contained a significant amount of T-BZN and Bi—Nb oxide phases. The T-BZN phase was eliminated and the Bi—Nb oxide phase was reduced to the two percent level during sintering at 1100° C., but a single phase ceramic was not obtained. Excess ZnO additions (Examples 42, 43, and 46) were effective in promoting C-BZN formation. A 10 mol % addition of excess ZnO (Example 42) was required to fully stabilize the C-BZN phase in powder calcined at 900° C., whereas a calcination temperature of 1000° C. was required with a 5 mol % excess ZnO addition (Examples 43 and 46). CaO substitution for $Bi_2O_3$ (Example 46) also promoted single-phase cubic pyrochlore formation during calcination, but to a lesser degree than excess ZnO. Sintered ceramics of Examples 42, 43, and 46 were all single phase cubic pyrochlore.

Figure 4B:
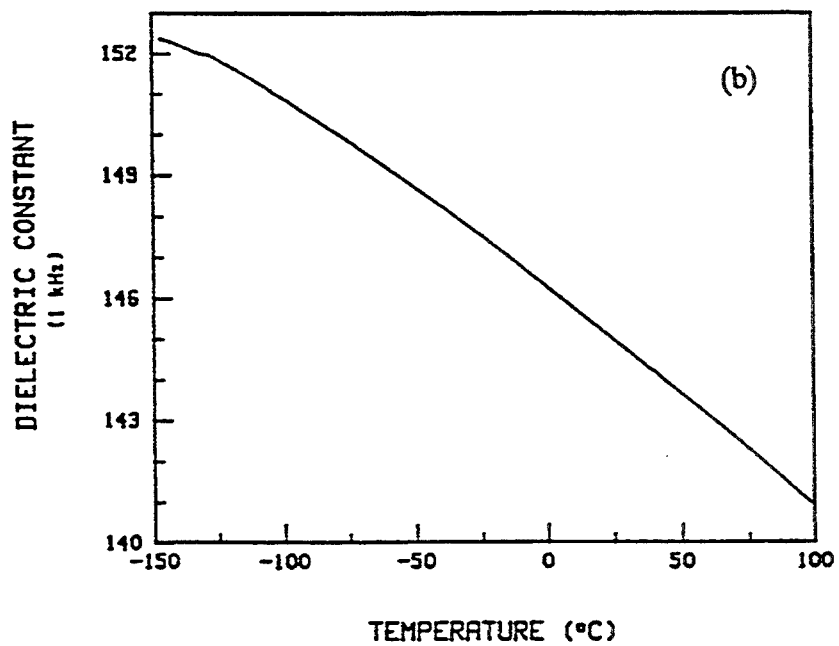
FIG. 4B is a plot showing the dielectric constant at 1 kHz for the C-BZN ceramic of Example 42 sintered at 1100° C. for one hour.

Density and dielectric property data for C-BZN ceramics of Examples 28, 43, 42, and 46 are presented in Table V. A sintering temperature of 1100° C. was required to achieve maximum density in C-BZN ceramics. Stoichiometric BZN ceramics (Example 28) sintered to translucency at 1100° C., with a density of $\rho \approx 6.70$ g/cm$^3$. Excess ZnO (Examples 42 and 43) increased sintered densities to the range of $\rho \approx 6.9$ to 7.0 g/cm$^3$. The 5 mol % CaO substitution for $Bi_2O_3$ (Example 46) resulted in slightly lower sintered density, $\rho \approx 6.85$ g/cm$^3$. The dielectric constant, $\epsilon_r$, of fully-dense C-BZN ceramics ranged from 140 to 145, with temperature coefficient, $T_A$, values of approximately $-360$ ppm/°C. The temperature coefficient was not significantly affected by either composition or processing conditions. The dielectric constant versus temperature curve for the C-BZN ceramic of Example 42 is shown in FIG. 4B. Excess ZnO additions at the 5 mol % level (Example 43) and 10 mol % level (Example 42) resulted in a slight increase of dielectric constant compared to stoichiometric C-BZN ceramics (Example 28), from $\epsilon_r = 141$ to $\epsilon_r = 145$. This may have been related to the combined effects of increased density and the absence of Bi—Nb oxide phases in C-BZN ceramics prepared with excess ZnO. In the 5-mol % excess ZnO compositions, a 5 mol % substitution of CaO for $Bi_2O_3$ (Example 46) resulted in a lower dielectric constant, $\epsilon_r = 140$ versus $\epsilon_r = 144$ for the calcium-free C-BZN ceramic (Example 43), possibly due to lower density. Compositional modifications such as excess ZnO additions and CaO substitution for $Bi_2O_3$ reduced the dielectric loss of C-BZN ceramics, with tan $\delta = 0.0009$ at 100 kHz for stoichiometric C-BZN ceramics (Example 28), decreasing to tan $\delta = 0.0005$ for the C-BZN ceramics of Examples 43 and 46, and decreasing even more to tan $\delta = 0.0002$ for the C-BZN ceramic with 10 mol % excess ZnO (Example 42).

EXAMPLES 39, 40 AND 41

Stoichiometric BZN ceramics of compositions represented by Formula 1 were prepared:
Ex. 39: x=0.333 $Bi_{1.667}(Zn_{0.667}Nb_{4/3})O_{6.50}$
Ex. 40: x=0.267: $Bi_{1.733}(Zn_{0.667}Nb_{4/3})O_{6.60}$
Ex. 41: x=0.200: $Bi_{1.800}(Zn_{0.667}Nb_{4/3})O_{6.70}$.

These BZN powders were prepared from $Bi_2O_3$ and $ZnNb_2O_6$, using methods described above, and calcined at 800° C. for 24 hours in air. Pellets prepared from these BZN powders were sintered at 1000° C. for one hour in air. Note that Examples 39, 40 and 41 did not contain excess zinc.

X-ray diffraction data for BZN powders and ceramics of Examples 39, 40, and 41 are presented in Table VI. In stoichiometric $Bi_{2-x}Zn_{2/3}Nb_{4/3}O_{7-3x/2}$ ceramics, Bi—Nb oxide phases were present in significant amounts (3 to 22 percent), both in calcined powders and sintered ceramics. The relative amounts of the primary phases, T-BZN and C-BZN, scaled with the batched composition: the relative amount of C-BZN phase increased as the x-value in the composition increased. The relative amount of C-BZN phase increased from calcined powder to sintered ceramic.

TABLE VI

| | XRD RESULTS: COMPOSITE BZN CERAMICS | | | | | | | |
|---|---|---|---|---|---|---|---|---|
| | Calcination Conditions | | | Sintering Conditions | | | T-BZN | C-BZN | Bi—Nb-Oxide |
| Example | T(°C.) | t(hr) | atm | T(°C.) | t(hr) | atm | ($I_{rel}$ %) | ($I_{rel}$ %) | ($I_{rel}$ %) |
| 39 | 800 | 24 | air | — | — | — | 100 | 44 | 10 |
| | 800 | 24 | air | 1000 | 1 | air | 54 | 100 | 22 |
| 40 | 800 | 24 | air | — | — | — | 100 | 26 | 6 |
| | 800 | 24 | air | 1000 | 1 | air | 100 | 70 | 16 |
| 41 | 800 | 24 | air | — | — | — | 100 | 16 | 3 |
| | 800 | 24 | air | 1000 | 1 | air | 100 | 48 | 10 |
| 53 | 850 | 8 | oxy* | — | — | — | 100 | 44 | 0 |
| | 850 | 8 | oxy | 1000 | 1 | oxy | 100 | 61 | 0 |
| 54 | 850 | 8 | oxy | — | — | — | 100 | 45 | 0 |
| | 850 | 8 | oxy | 1000 | 1 | oxy | 100 | 65 | 0 |
| 56 | 850 | 8 | oxy | — | — | — | 100 | 41 | 0 |
| | 850 | 8 | oxy | 1000 | 1 | oxy | 100 | 99 | 0 |
| | 850 | 8 | oxy | 1000 | 1 | air | 100 | 95 | 0 |
| | 850 | 8 | air | — | — | — | 100 | 62 | 2 |
| | 850 | 8 | air | 1000 | 1 | oxy | 100 | 93 | 0 |
| | 850 | 8 | air | 1000 | 1 | air | 76 | 100 | 0 |
| 57 | 850 | 8 | air | — | — | — | 100 | 65 | 3 |
| | 850 | 8 | air | 1000 | 1 | air | 76 | 100 | 0 |
| 47 | — | — | — | 1000 | 1 | oxy* | 100 | 70 | 0 |
| 48 | — | — | — | 1000 | 1 | oxy | 81 | 100 | 0 |
| 49 | — | — | — | 1000 | 1 | oxy | 100 | 59 | 0 |
| 50 | — | — | — | 1000 | 1 | oxy | 100 | 55 | 0 |

*oxy = oxygen atmosphere

Figure 5A:
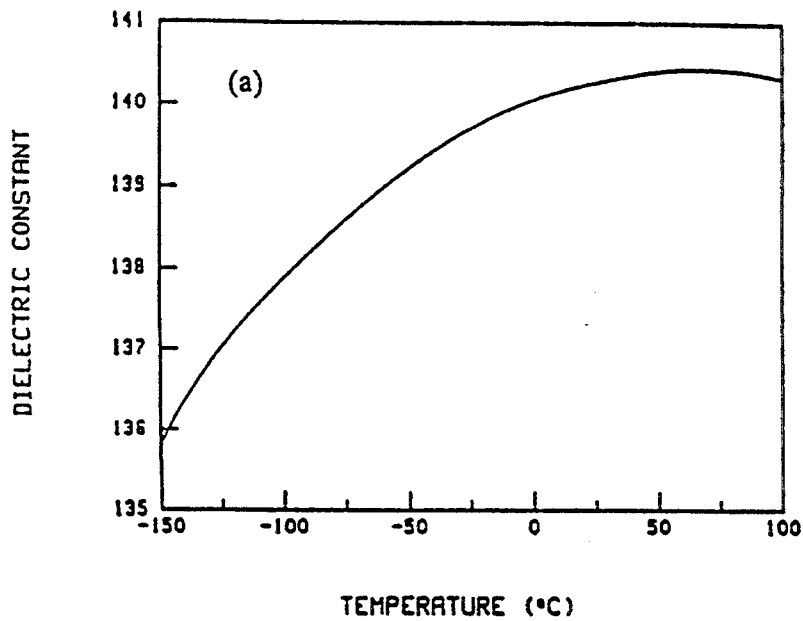
FIG. 5A is a plot showing the dielectric constant at 1 kHz versus temperature for the stoichiometric $Bi_{2-x}(Zn_{2/3}Nb_{4/3})O_{7-3x/2}$ ceramic of Example 39 (x=0.333).
Figure 5B:
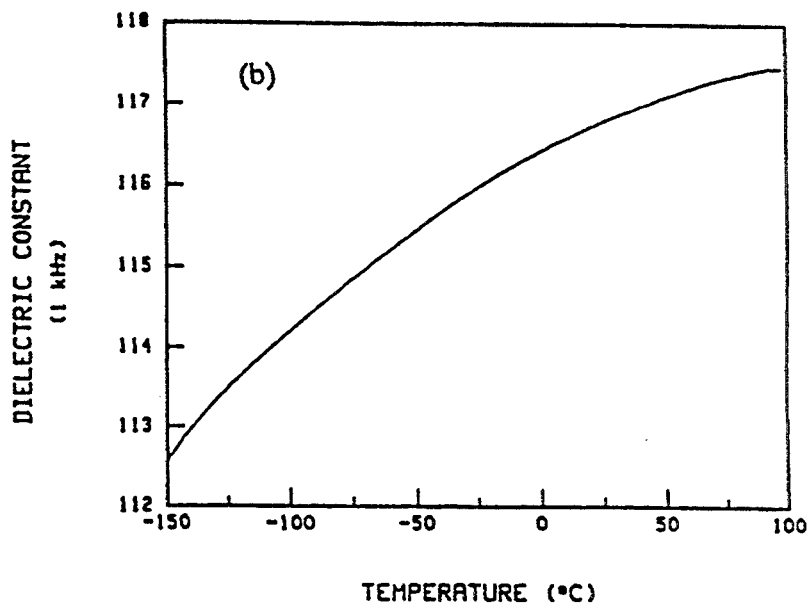
FIG. 5B is a plot showing the dielectric constant at 1 kHz versus temperature for the stoichiometric $Bi_{2-x}(Zn_{2/3}Nb_{4/3})O_{7-3x/2}$ ceramic of Example 40 (x=0.267).
Figure 5C:
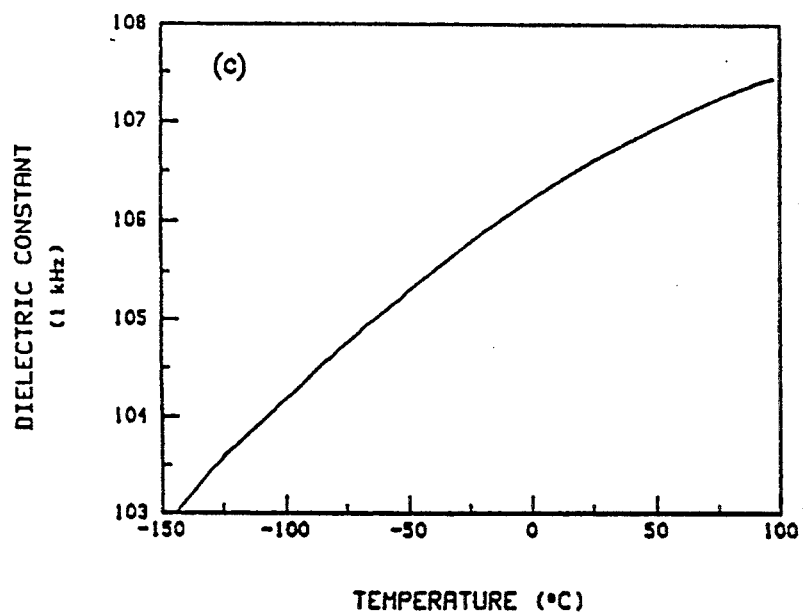
FIG. 5C is a plot showing the dielectric constant at 1 kHz versus temperature for the stoichiometric $Bi_{2-x}Zn_{2/3}Nb_{4/3})O_{7-3x/2}$ ceramic of Example 41 (x=0.200).

Density and dielectric property data for BZN ceramics of Examples 39, 40, and 41 are presented in Table VII, and dielectric constant versus temperature curves are presented in FIGS. 5A, 5B, and 5C. These stoichiometric BZN ceramics sintered to high density (translucency) at 1000° C. However, the observed sintered densities, $\rho \approx 7.4$ to 7.5 g/cm$^3$, were higher than would have been expected based on the densities of the T-BZN and C-BZN end-member phases, probably due to the presence of Bi—Nb oxide phases. The dielectric properties of these stoichiometric BZN ceramics were significantly affected by the presence of Bi—Nb oxide phases. The $\epsilon_r$ and $T_\epsilon$ values were higher than expected, based on dielectric modelling studies. The dielectric losses also were higher than those of the end-member T-BZN and C-BZN ceramics. The dielectric constant decreased from $\epsilon_r = 140$ to $\epsilon_r = 107$, and the temperature coefficient increased from $T_\epsilon = +46$ ppm/°C. to $T_\epsilon = +136$ ppm/°C., as the composition changed from x=0.33 (Example 39) to x=0.200 (Example 41). These trends were consistent with the smaller C-BZN content with decreasing x-value. Maxima in the dielectric constant versus temperature developed above room temperature, as shown in FIGS. 5A, 5B, and 5C. The temperatures of these maxima shifted to lower temperature with increasing C-BZN content (higher x-value). The dielectric loss also decreased from tan $\delta = 0.0045$ to tan $\delta = 0.0020$ at 100 kHz as the composition changed from x=0.333 (Example 39) to x=0.20 (Example 41), consistent with the reduction of the Bi—Nb oxide phase content with decreasing x-value.

Ex. 54: x=0.267, y=0.20, z=0.02: (Bi$_{1.700}$Ca$_{0.035}$)(Zn$_{0.733}$Nb$_{4/3}$)O$_{6.650}$.

These BZN powders were prepared from mixtures of Bi$_2$O$_3$, ZnNb$_2$O$_6$, ZnO, and/or CaCO$_3$, and calcined at 850° C. for eight hours in flowing oxygen. Pellets prepared from these BZN powders were sintered at 1000° C. for one hour in flowing oxygen. Larger samples were also prepared for microwave dielectric measurements. Compare these examples to Example 39, 40, and 41 that did not contain excess zinc.

X-ray diffraction data for BZN powders and ceramics of Examples 53 and 54 are presented in Table VI. The 10 mol % excess ZnO addition was very effective in reducing the amount of Bi—Nb oxide phase. The Bi—Nb oxide phase was completely absent in powders calcined at 850° C. and in ceramics sintered at 1000° C. The relative amount of C-BZN phase increased from calcined powder to sintered ceramic. The 2 mol % CaO substitution for Bi$_2$O$_3$ increased the relative C-BZN content slightly in sintered BZN ceramics.

Figure 6A:
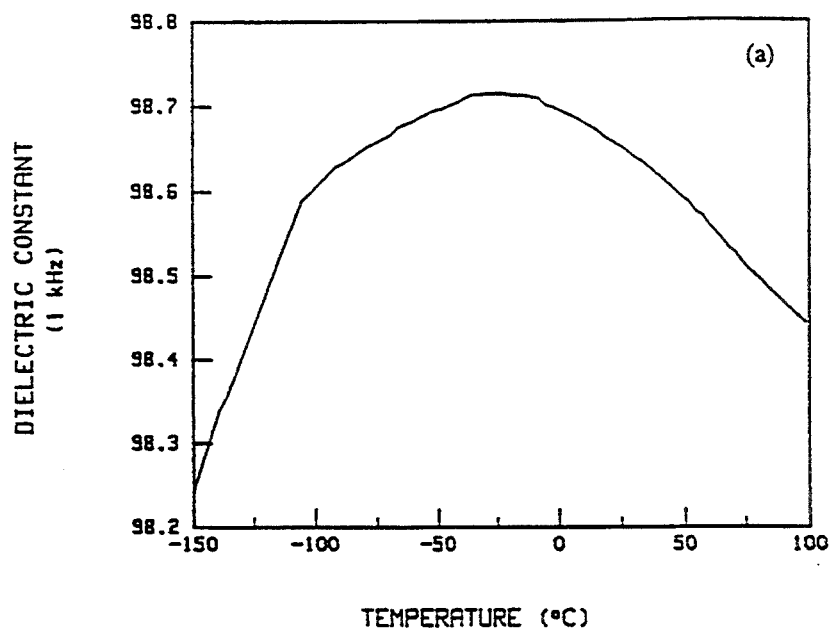
FIG. 6A is a plot showing the dielectric constant at 1 kHz versus temperature for the modified BZN ceramic of Example 53.
Figure 6B:
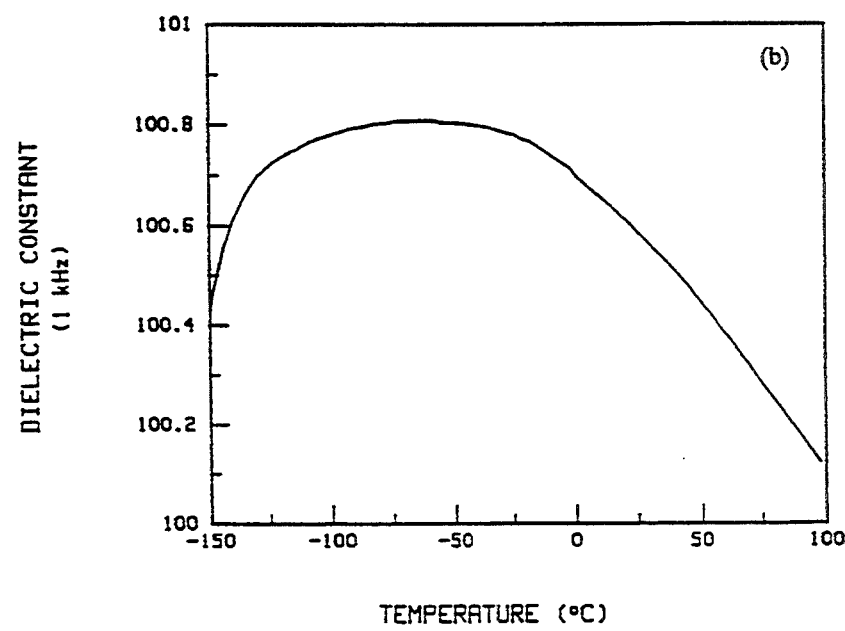
FIG. 6B is a plot showing the dielectric constant at 1 kHz versus temperature for the modified BZN ceramic of Example 54.
Figure 7A:
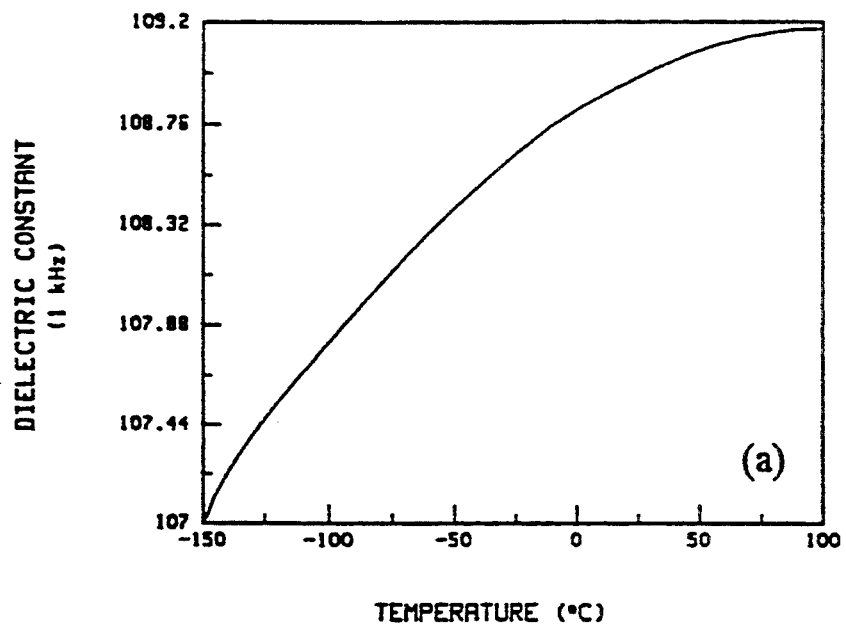
FIG. 7A is a plot showing the dielectric constant at 1 kHz versus temperature for a modified BZN ceramic prepared from mixed calcined powders (Example 47).
Figure 7B:
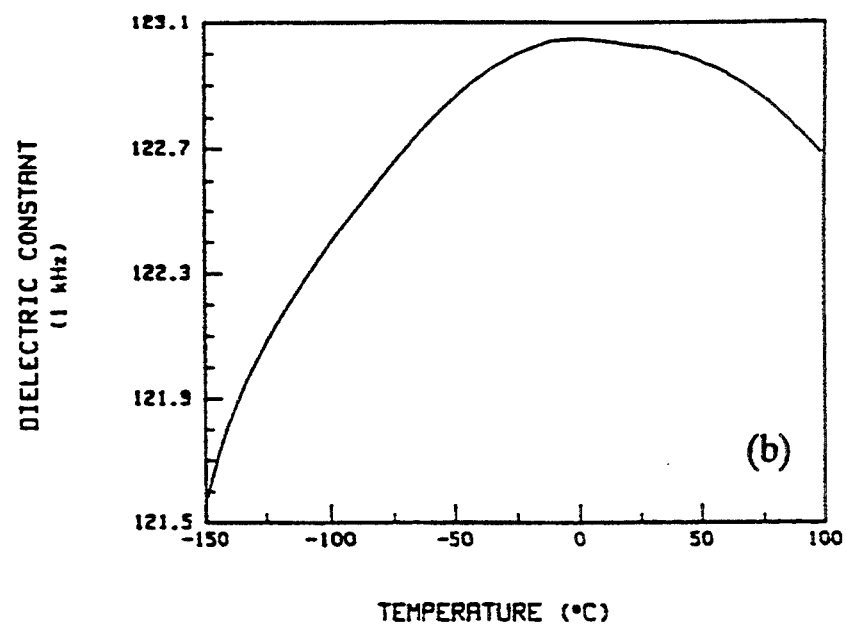
FIG. 7B is a plot showing the dielectric constant at 1 kHz versus temperature for a modified BZN ceramic prepared from mixed calcined powders (Example 48).
Figure 7C:
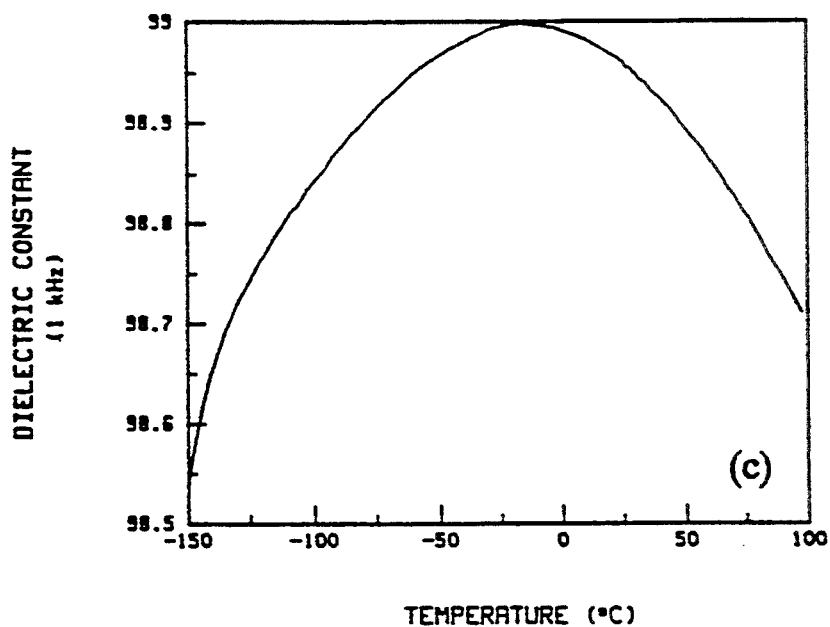
FIG. 7C is a plot showing the dielectric constant at 1 kHz versus temperature for a modified BZN ceramic prepared from mixed calcined powders (Example 49).
Figure 7D:
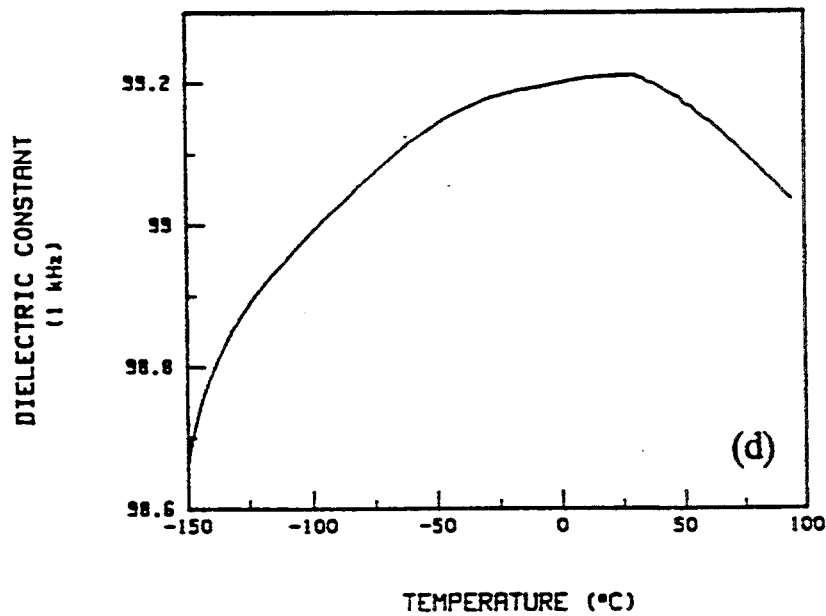
FIG. 7D is a plot showing the dielectric constant at 1 kHz versus temperature for a modified BZN ceramic prepared from mixed calcined powders (Example 50).

Density and dielectric property data for BZN ceramics of Examples 53 and 54 are presented in Table VII. Dielectric constant versus temperature curves for BZN ceramics of Examples 53 and 54 are compared in FIGS. 6A and 6B. Sintered densities $\rho \approx 7.3$ g/cm$^3$ were intermediate to the densities of the C-BZN and T-BZN phases. The 2 mol % CaO substitution for Bi$_2$O$_3$ (Example 54) had no effect on densification when 10 mol % excess ZnO was added. The dielectric properties of the BZN ceramic of Example 53, modified with 10 mol % excess ZnO, were very favorable, with $\epsilon_r \approx 100$, $T_\epsilon = -17$ ppm/°C., and extremely low dielectric loss, tan $\delta \leq 0.0001$ at 100 kHz. The 2 mol % CaO substitution for Bi$_2$O$_3$ (Example 54) resulted in an increase of $\epsilon_r$ to 104, and a reduction of the $T_\epsilon$ to $-52$ ppm/°C., and no change in dielectric loss, tan $\delta \leq 0.0001$ at 100 kHz. Microwave dielectric measurements made on BZN ceramic samples of Examples 53 and 54 are summarized below in Table VIII.

TABLE VII

DENSITY AND DIELECTRIC PROPERTY DATA: COMPOSITE BZN CERAMICS

| | Calcination Conditions | | | Sintering Conditions* | Density | Dielectric Properties at 25° C. | | |
|---|---|---|---|---|---|---|---|---|
| Example | T(°C.) | t(hr) | atm | atm | (g/cm$^3$) | $\epsilon_r$ | tan $\delta$(100 kHz) | $\tau_\epsilon$(ppm/°C.) |
| *BZN Ceramics: Prepared from Bi$_2$O$_3$ and ZnNb$_2$O$_6$* | | | | | | | | |
| 39 | 800 | 24 | air | air | 7.36 | 140 | 0.0045 | +46 |
| 40 | 800 | 24 | air | air | 7.42 | 117 | 0.0030 | +114 |
| 41 | 800 | 24 | air | air | 7.48 | 107 | 0.0020 | +136 |
| 53 | 850 | 8 | oxy** | oxy | 7.29 | 99 | 0.0001 | −17 |
| 54 | 850 | 8 | oxy | oxy | 7.37 | 104 | 0.0001 | −52 |
| 56 | 850 | 8 | oxy | oxy | 7.27 | 109 | 0.0002 | −77 |
| 56 | 850 | 8 | oxy | air | 7.35 | 112 | 0.0010 | −75 |
| 56 | 850 | 8 | air | oxy | 7.27 | 107 | 0.0004 | — |
| 56 | 850 | 8 | air | air | 7.32 | 121 | 0.0014 | −95 |

*All sintering conditions were 1000° C. for 1 hour.
**denotes oxygen

| | Calcination Conditions | | | Sintering Conditions* | Density | Dielectric Properties at 25° C. | | |
|---|---|---|---|---|---|---|---|---|
| Example | T(°C.) | t(hr) | atm | atm | (g/cm$^3$) | $\epsilon_r$ | tan $\delta$(100 kHz) | $\tau_\epsilon$(ppm/°C.) |
| *BZN Ceramics, Prepared from Oxides* | | | | | | | | |
| 57 | 850 | 8 | air | air | 7.06 | 113 | 0.0009 | −114 |
| *BZN Ceramics: Mixtures of Calcined T-BZN and C-BZN Powders* | | | | | | | | |
| 47 | — | — | — | oxy | 7.40 | 108 | 0.0015 | +46 |
| 48 | — | — | — | oxy | 7.30 | 122 | 0.0021 | −15 |
| 49 | — | — | — | oxy | 7.22 | 99 | 0.0001 | −20 |
| 50 | — | — | — | oxy | 7.30 | 99 | 0.0001 | −20 |

*All sintering conditions were 1000° C. for 1 hour.
**oxy = oxygen atmosphere

EXAMPLES 53 AND 54

Modified BZN ceramics were prepared as described above with compositions represented by Formula 3 above. Two such compositions were prepared:

Ex. 53: x=0.267, y=0.20, z=0: Bi$_{1.733}$(Zn$_{0.733}$Nb$_{4/3}$)O$_{6.67}$

TABLE VIII

RESULTS OF MICROWAVE DIELECTRIC MEASUREMENTS

| Example 53 | Example 54 |
|---|---|
| $\epsilon_r = 101$ at $f = 1.49$ GHz | $\epsilon_r = 104$ at $f = 1.51$ GHz |
| $Q = 1045$ at $f = 4.77$ GHz | $Q = 1420$ at $f = 3.78$ GHz |
| $Q \cdot f = 5000$ GHz | $Q \cdot f = 5400$ GHz |

Figure 8A:
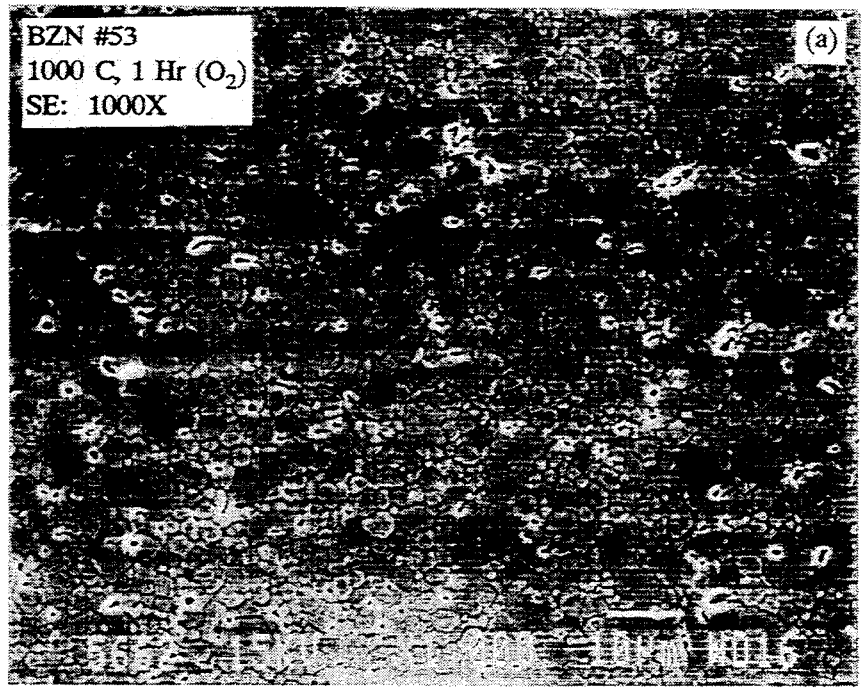
FIG. 8A is a secondary electron micrograph at 1000× of BZN ceramic Example 53, sintered in oxygen at 1000° C. for 1 hour.
Figure 8B:
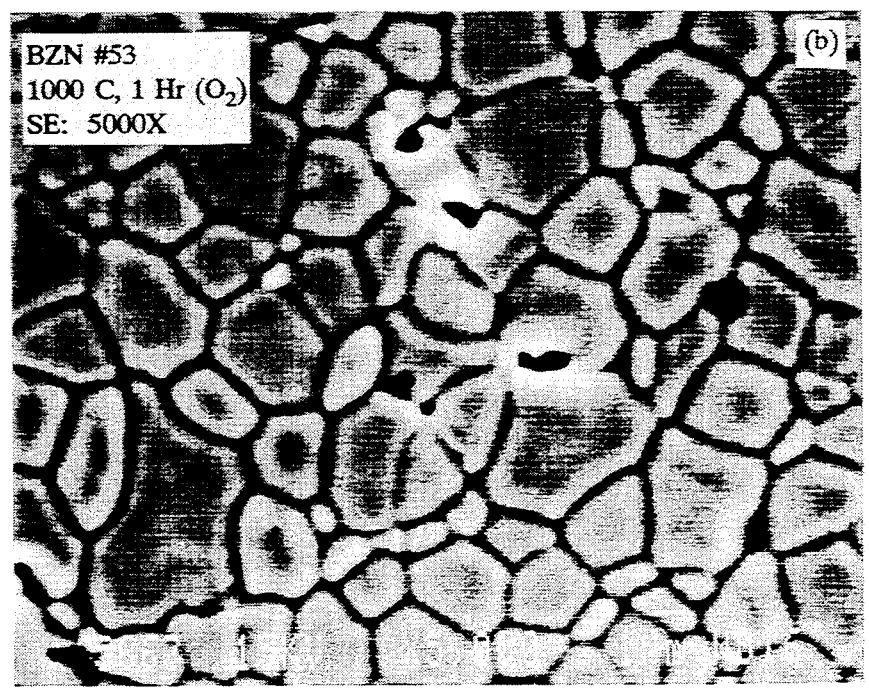
FIG. 8B is a secondary electron micrograph at 5000× of BZN ceramic Example 53, sintered in oxygen at 1000° C. for 1 hour.
Figure 8C:
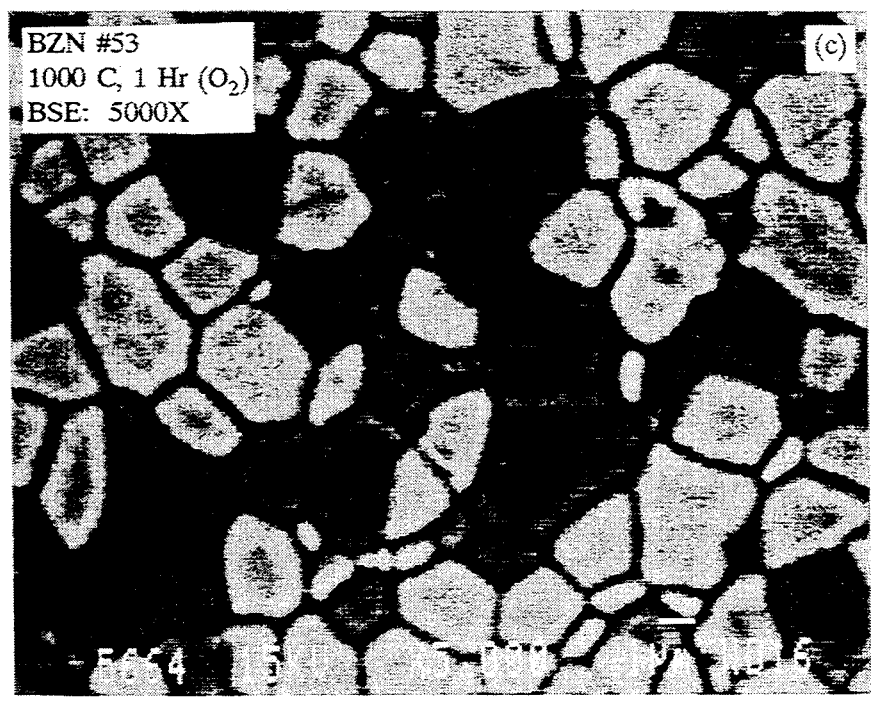
FIG. 8C is a backscatter electron micrograph at 5000× of BZN ceramic Example 53, sintered in oxygen at 1000° C. for 1 hour.
Figure 9A:
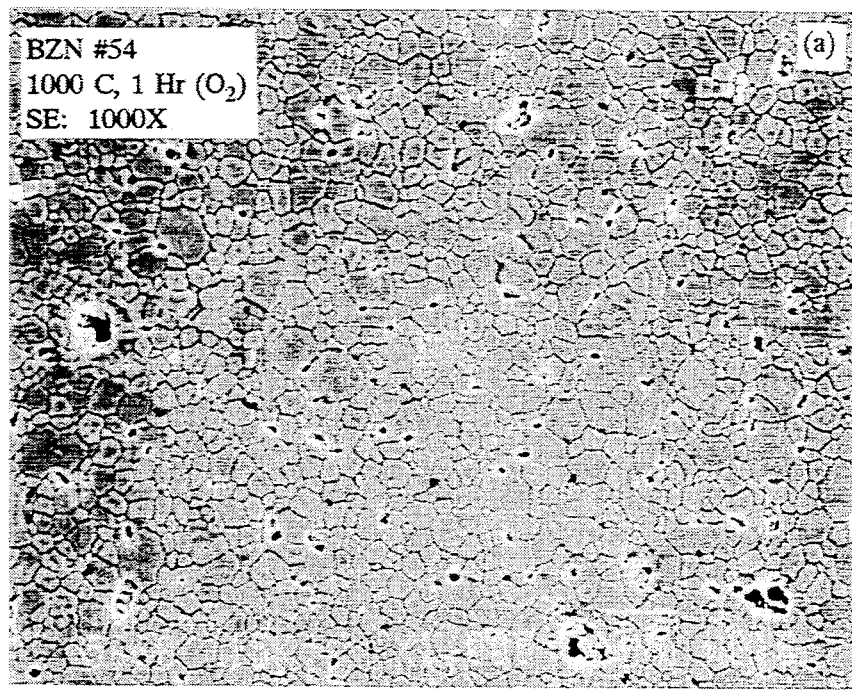
FIG. 9A is a secondary electron micrograph at 1000× of BZN ceramic Example 54, sintered in oxygen at 1000° C. for 1 hour.
Figure 9B:
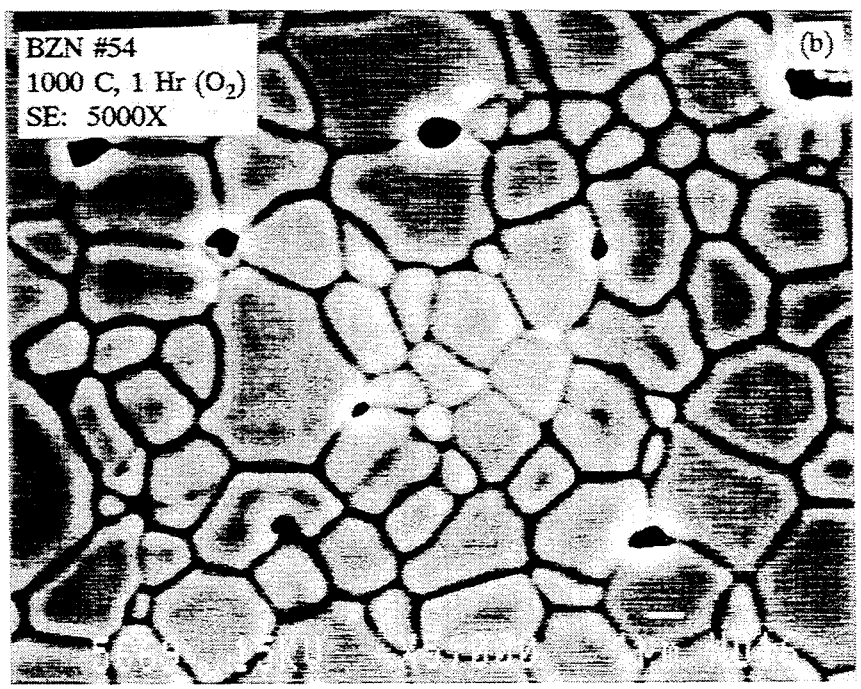
FIG. 9B is a secondary electron micrograph at 5000× of BZN ceramic Example 54, sintered in oxygen at 1000° C. for 1 hour.
Figure 9C:
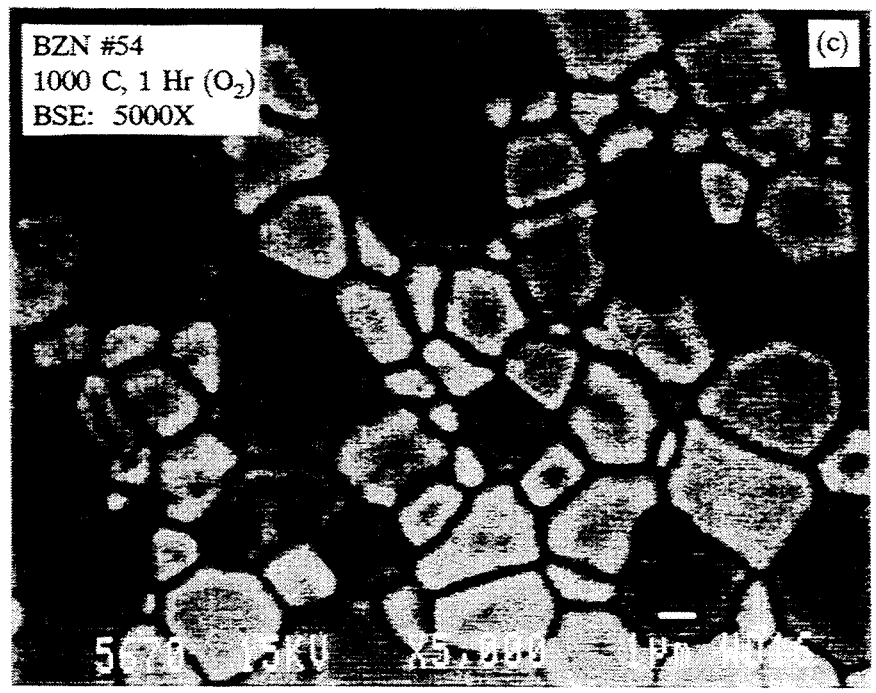
FIG. 9C is a backscatter electron micrograph at 5000× of BZN ceramic Example 54, sintered in oxygen at 1000° C. for 1 hour.

Scanning electron micrographs of polished and thermally etched surfaces of BZN ceramics of Examples 53 and 54 are presented in FIGS. 8A, 8B, 8C; and FIGS. 9A, 9B, and 9C, respectively. The BZN ceramics of Examples 53 and 54 exhibited dense microstructure, consisting of uniformly sized, 2–4 micron BZN grains. There was no evidence of Bi—Nb oxide phases in either of these ceramics. The T-BZN and C-BZN phases could be differentiated from the backscatter electron micrographs in FIGS. 8C and 9C, because of the light and dark contrast of T-BZN and C-BZN phases, respectively. The T-BZN and C-BZN phases existed in evenly-distributed clusters of about 5 to 10 grains.

EXAMPLE 56

BZN ceramics of compositions represented by Formula 2, having the formula,

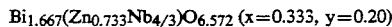

$Bi_{1.667}(Zn_{0.733}Nb_{4/3})O_{6.572}$ (x=0.333, y=0.20)

were prepared from $Bi_2O_3$ and $Zn_{1.10}Nb_2O_{6.10}$, using methods described above. Half of this BZN powder batch was calcined at 850° C. for eight hours in flowing oxygen, and the other half was calcined at 850° C. for 8 hours in air. Pellets prepared from these BZN powders were sintered at 1000° C. for one hour in flowing oxygen and air atmospheres.

X-ray diffraction data for BZN powders and ceramics of Example 56 are presented in Table VI. In BZN ceramics of Example 56, the heat treatment atmosphere had significant effects on Bi—Nb oxide phase formation during calcination and the relative amounts of T-BZN and C-BZN phases in sintered ceramics. Calcination in air at 850° C. for eight hours resulted in a small amount, less than two percent, of Bi—Nb oxide phase, whereas the Bi—Nb oxide phase was absent in powders calcined in oxygen. Larger C-BZN contents were observed in air-sintered ceramics prepared from air-calcined powder. Oxygen-sintered ceramics prepared from air-calcined powder and oxygen-sintered ceramics prepared from air-calcined powder had C-BZN contents similar to BZN ceramics processed entirely in oxygen.

Density and dielectric property data for BZN ceramics of Example 56 are presented in Table VII. Processing atmosphere affected densification of these BZN ceramics. Air-calcined and air-sintered BZN ceramics had slightly higher sintered densities than oxygen-calcined and oxygen-sintered BZN ceramics, consistent with the higher C-BZN content in air-processed BZN ceramics. In BZN ceramics of Example 56, processing atmosphere had a significant impact on dielectric properties. For BZN ceramics processed in air the dielectric constant was significantly higher, with $\epsilon_r = 121$ versus $\epsilon_r = 109$; the temperature dependence was more negative, with $T_\epsilon = -95$ ppm/°C. versus $T_\epsilon = -77$ ppm/°C.; and dielectric losses were much higher, with tan $\delta = 0.0014$ versus tan $\delta = 0.0002$, compared to oxygen processed materials. The increased dielectric constant and more negative temperature dependence is consistent with the larger C-BZN content in air-processed BZN ceramics. Oxygen-atmosphere sintering of air-calcined BZN ceramics and air-atmosphere sintering of oxygen-calcined BZN ceramics exhibited dielectric constant values of $\epsilon_r = 112$ and $\epsilon_r = 107$, respectively, and dielectric loss values of tan $\delta = 0.0010$ and tan $\delta = 0.0004$, respectively. These experiments suggested that the calcining in oxygen and sintering in oxygen both have favorable effects on dielectric loss, but that oxygen sintering provides the most benefit. It is also significant that dielectric constant values are similar in BZN ceramics prepared with one or both of the calcining and sintering operations performed in oxygen. This is consistent with the similar C-BZN contents in these ceramics.

EXAMPLE 57

BZN ceramics of a composition identical to that of Example 56 (x=0.333, y=0.20) were prepared from the constituent oxides ($Bi_2O_3$, ZnO, and $Nb_2O_5$), using methods described above. This BZN powder was calcined at 850° C. for eight hours in air, and pellets prepared from this BZN powder were sintered at 1000° C. for one hour in air. This example also illustrates the processes of mixing excess zinc oxide and/or calcium carbonate powders with the precursor powders prior to calcination to obtain a modified (non-stoichiometric) precursor. For instance, Example 56 used a modified zinc niobate precursor powder from Example 51. The modified precursor can then be combined directly with bismuth oxide, without any additional ZnO or $CaCO_3$, to obtain the advantageous properties of the invention as is discussed herein.

X-ray diffraction data for BZN powders and ceramics of Example 57 are presented in Table VI. The preparation of BZN ceramics of Example 57 from oxides resulted in a slightly larger Bi—Nb oxide phase content, and an identical ratio of T-BZN and C-BZN phases compared to columbite processed BZN ceramics of Example 56. This comparison relates to calcining and sintering operations performed in air.

Density and dielectric property data of BZN ceramics of Example 57 are presented in Table VII. When BZN powder was prepared from oxides (Example 57), instead of using the columbite precursor method (Example 56), significantly lower sintered densities were observed with $\rho \approx 7.1$ g/cm³ versus $\rho \approx 7.3$ g/cm³. It is important to note that green body densities of pellets of oxide-prepared powder were significantly lower with $\rho \approx 5.09$ g/cm³, versus $\rho \approx 5.30$ g/cm³ for pellets prepared from BZN powder of the same composition prepared using the columbite precursor method. This may have been responsible for the lower sintered densities. The oxide-prepared and air-processed BZN ceramics of Example 57 exhibited lower dielectric constant with $\epsilon_r = 113$ versus $\epsilon_r = 121$, more negative temperature dependence with $T_\epsilon = -114$ ppm/°C. versus $T_\epsilon = -95$ ppm/°C., and slightly lower dielectric loss with tan $\delta = 0.009$ versus tan $\delta = 0.0014$, compared to air-processed BZN ceramics of Example 56 prepared using the columbite precursor method. The lower dielectric constant probably is due to the lower density of BZN ceramics of Example 57, but the more negative $T_\epsilon$ was not expected because of the identical C-BZN contents of air-processed BZN ceramics of Examples 56 and 57.

EXAMPLES 47, 48, 49, 50

BZN ceramics of compositions represented by Formula 3 were produced from powder mixtures that were prepared by milling appropriate amounts of T-BZN (Examples 44 and 45) and C-BZN (Examples 42 and 46) powders. BZN ceramics of Example 47 (x=0.267, y=0.08, z=0) and Example 48 (x=0.333, y=0.10, z=0) were prepared from mixtures of T-BZN (Example 42) and C-BZN (Example 44) powders. The BZN ceramics of Example 49 (x=0.267, y=0.08, z=0.03) were prepared from mixtures of T-BZN (Example 45) and C-BZN (Example 42) powders. The BZN ceramics of Example 50 (x=0.267, y=0.04, z=0.05) were prepared from mixtures of T-BZN (Example 45) and C-BZN (Example 46) powders. Pellets prepared from these BZN powder mixtures were sintered at 1000° C. for one hour in flowing oxygen.

X-ray diffraction data for BZN powders and ceramics of Examples 47, 48, 49, and 50 are presented in Table VI. Preparation of BZN ceramics from mixtures of calcined end-member powders led to two-phase (T-BZN and C-BZN) ceramics without any Bi—Nb oxide phases. For the BZN ceramics with x=0.267, the calcium-containing BZN ceramics (Examples 49 and 50) had slightly lower C-BZN phase content than the calcium-free BZN ceramics (Example 47).

Density and dielectric property data for BZN ceramics of Examples 47, 48, 49, and 50 are presented in Table VII, and dielectric constant versus temperature curves are presented in FIGS. 7A, 7B, 7C, and 7D. These BZN ceramics sintered to high density with $\rho \approx 7.2$ to 7.4 g/cm$^3$ at 1000° C. Slightly lower densities were observed in calcium-containing BZN ceramics (Examples 49 and 50), compared to calcium-free BZN ceramics (Examples 47 and 48). Some sample-to-sample variation was noted in the dielectric properties of samples sintered in different sintering runs; differences in $\epsilon_r$ values were consistent with lower sample densities. As was observed above for BZN ceramics of earlier examples, maxima in the dielectric constant versus temperature were observed in these composite BZN ceramics. The temperature of these maxima shifted to lower temperature with increasing x-value (i.e., Example 48) and in BZN ceramics containing calcium (Examples 49 and 50), consistent with an increase of relative C-BZN content. For the calcium-free BZN ceramics of Examples 47 and 48, $\epsilon_r$ increased from 109 to 123, and $T_\epsilon$ decreased from +46 ppm/°C. to −15 ppm/°C., consistent with an increase of C-BZN content, i.e. as the composition changed from x=0.267 (Example 47) to x=0.333 (Example 48). For a constant C-BZN content (x=0.267), the dielectric constant decreased from $\epsilon_r$=109 for the calcium-free BZN ceramic (Example 47) to $\epsilon_r$=99 for the calcium-containing ceramics (Examples 49 and 50). The calcium addition shifted the dielectric constant maxima to lower temperature, thus reducing the $T_\epsilon$ value from +46 to −20 ppm/°C. Dielectric losses were significantly lower with tan $\delta < 0.0002$ in calcium-containing BZN ceramics (Examples 49 and 50), versus tan $\delta > 0.0015$ for calcium-free BZN ceramics (Examples 47 and 48). Note that the overall excess ZnO content of these BZN ceramics (4 and 5 mol %, respectively) may not be sufficient to provide reduced dielectric loss as was observed above for BZN ceramics with 10 mol % excess ZnO.

When prepared with optimum composition and with optimum processing conditions, the BZN ceramics of this invention exhibit $\epsilon_r \approx 100$, $T_\epsilon$ and $T_f$ values close to zero, and extremely low dielectric loss. These temperature-compensated BZN ceramics have Q·f products larger than 5000 GHz at frequencies in the 4–5 GHz range, equivalent to Q values of greater than 3000 at 1.5 GHz. Thus, the BZN ceramics have the largest Q values obtained to date for microwave dielectric ceramics with high permittivity, $\epsilon_r \approx 100$, and would be very suitable for use in resonant filters for mobile telephones and other applications. The BZN ceramics of this invention also would be suitable for use as a dielectric material in multilayer ceramic capacitors.

While the forms of the invention herein disclosed constitute presently preferred embodiments, many others are possible. It is not intended herein to mention all of the possible equivalent forms or ramifications of the invention. It is to be understood that the terms used herein are merely descriptive, rather than limiting, and that various changes may be made without departing from the spirit of the scope of the invention.

We claim:

1. A dielectric ceramic composition comprising a sintered mixture represented by the formula,

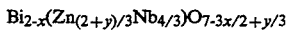

$$Bi_{2-x}(Zn_{(2+y)/3}Nb_{4/3})O_{7-3x/2+y/3}$$

wherein $0.240 \leq x \leq 0.333$, and $0.120 \leq y \leq 0.300$.

2. The composition according to claim 1, comprising: $0.25 \leq x \leq 0.30$, and $0.15 \leq y \leq 0.25$.

3. The composition according to claim 1, further comprising:
   (a) substitutions for Bi selected from the group consisting of Sr, Ba, Y, Pb, Cd, La and other rare earth elements having atomic numbers 58–71 of the periodic table, wherein said substitutions comprise less than 20 mol % based on Bi content;
   (b) substitutions for Zn selected from the group consisting of Mg, Ca, Co, Mn, Ni, and Cu, wherein said substitutions comprise less than 20 mol % based on Zn content; and
   (c) substitutions for Nb selected from the group consisting of Sn, Ti, Zr, Hf, and Ta, wherein said substitutions comprise less than 20 mol % based on Nb content.

4. The composition according to claim 3, wherein said substitutions for Bi, Zn, or Nb are each less than 10 mol % based on Bi, Zn, or Nb content respectively.

5. The composition according to claim 1, comprising:
Dielectric constant: $\epsilon_r \geq 100$, and
Product of Microwave Q·f, (1–5 GHz): Q·f$\geq$5000 GHz.

6. The composition according to claim 1, comprising:
Dielectric constant: $\epsilon_r$=90 to 120
Temperature dependence of $\epsilon$: $T_\epsilon$ = −100 to 100 ppm/°C.
Temperature dependence of resonant frequency: $|T_f| \leq 100$ ppm/°C.
Tan $\delta$ at 100 kHz: tan $\delta < 0.0002$
Product of Microwave Q·f, (1–5 GHz): Q·f$>$1000 GHz.

7. The composition according to claim 6, comprising:
Dielectric constant: $\epsilon_r$=90 to 110
Temperature dependence of resonant frequency: $|T_f| \leq 20$ ppm/°C.
Product of Microwave Q·f, (1–5 GHz): Q·f$\geq$5000 GHz.

8. A dielectric ceramic composition comprising a sintered mixture represented by the formula, $$(Bi_{1-z}Ca_z)_{2-x}(Zn_{(2+y)/3}Nb_{4/3})O_{7-3x/2+y/3+xz/2-z}$$

wherein $0 \leq x \leq 0.667$, $0 \leq y \leq 0.300$, and $0 \leq z \leq 0.200$.

9. The composition according to claim 8, comprising: $0.240 \leq x \leq 0.333$, $0.120 \leq y \leq 0.300$, and $0 \leq z \leq 0.200$.

10. The composition according to claim 9, comprising: $0.25 \leq x \leq 0.30$, $0.15 \leq y \leq 0.25$, and $0 \leq z \leq 0.10$.

11. The composition according to claim 8, comprising:
   (a) substitutions for Bi selected from the group consisting of Sr, Ba, Y, Pb, Cd, La and other rare earth elements having atomic numbers 58–71 of the periodic table, wherein said substitutions comprise less than 20 mol % based on Bi content;
   (b) substitutions for Zn selected from the group consisting of Mg, Ca, Co, Mn, Ni, and Cu, wherein said substitutions comprise less than 20 mol % based on Zn content; and
   (c) substitutions for Nb selected from the group consisting of Sn, Ti, Zr, Hf, and Ta, wherein said substitutions comprise less than 20 mol % based on Nb content.

12. The composition according to claim 11, wherein said substitutions for Bi, Zn, or Nb are each less than 10 mol % based on Bi, Zn, or Nb content respectively.

13. The composition according to claim 8, comprising:
   Dielectric constant: $\epsilon_r \geq 100$
   Product of Microwave Q·f, (1–5 GHz): Q·f $\geq 5000$ GHz.

14. The composition according to claim 8, comprising:
   Dielectric constant: $\epsilon_r = 80$ to 145
   Temperature dependence of $\epsilon$: $T_\epsilon = -360$ to 200 ppm/°C.
   Temperature dependence of resonant frequency: $|T_f| \leq 200$ ppm/°C.
   Tan δ at 100 kHz: tan δ < 0.0002
   Product of Microwave Q·f, (1–5 GHz): Q·f > 1000 GHz.

15. The composition according to claim 14, comprising:
   Dielectric constant: $\epsilon_r = 90$ to 110
   Temperature dependence of resonant frequency: $|T_f| \leq 20$ ppm/°C.
   Product of Microwave Q·f, (1–5 GHz): Q·f $\geq 5000$ GHz.

* * * * *